(12) United States Patent
Nakayama

(10) Patent No.: US 10,459,125 B2
(45) Date of Patent: Oct. 29, 2019

(54) OPTICAL MEMBER, METHOD FOR MANUFACTURING OPTICAL MEMBER, AND OPTICAL FILM OF OPTICAL MEMBER

(71) Applicant: CANON KABUSHIKI KAISHA, Tokyo (JP)

(72) Inventor: Tomonari Nakayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/433,941

(22) Filed: Feb. 15, 2017

(65) Prior Publication Data

US 2017/0160437 A1 Jun. 8, 2017

Related U.S. Application Data

(62) Division of application No. 13/860,988, filed on Apr. 11, 2013, now abandoned.

(30) Foreign Application Priority Data

Apr. 16, 2012 (JP) ................. 2012-093068

(51) Int. Cl.
| | | |
|---|---|---|
| *G02B 1/111* | (2015.01) | |
| *G02B 1/118* | (2015.01) | |
| *G02B 1/11* | (2015.01) | |
| *B05D 5/06* | (2006.01) | |
| *C03C 17/42* | (2006.01) | |

(Continued)

(52) U.S. Cl.
CPC ............... *G02B 1/118* (2013.01); *B05D 1/18* (2013.01); *B05D 1/38* (2013.01); *B05D 5/06* (2013.01); *B05D 5/061* (2013.01); *C03C 3/085* (2013.01); *C03C 3/087* (2013.01); *C03C 3/097* (2013.01); *C03C 17/42* (2013.01); *C08G 73/106* (2013.01); *C08G 73/1042* (2013.01); *C08G 73/1046* (2013.01); *C08G 73/1075* (2013.01); *C09D 1/00* (2013.01); *C09D 5/006* (2013.01); *C09D 161/28* (2013.01); *C09D 179/06* (2013.01); *C09D 179/08* (2013.01); *G02B 1/11* (2013.01); *G02B 1/111* (2013.01); *G02B 1/115* (2013.01); *C03C 2217/425* (2013.01); *C03C 2217/73* (2013.01);

(Continued)

(58) Field of Classification Search
CPC .......... G02B 1/11; G02B 1/111; G02B 1/115; G02B 1/10–1/18
USPC .................................... 427/162–169
See application file for complete search history.

(56) References Cited

U.S. PATENT DOCUMENTS

2008/0310026 A1* 12/2008 Nakayama ............ G02B 1/111
359/586
2012/0049308 A1* 3/2012 Nishimura ......... C08G 73/0273
257/432

FOREIGN PATENT DOCUMENTS

WO    WO 2011/105614    * 9/2011

* cited by examiner

*Primary Examiner* — Elizabeth A Burkhart
(74) *Attorney, Agent, or Firm* — Canon U.S.A. Inc., IP Division

(57) ABSTRACT

An optical member includes a laminated body configured to reduce light reflection disposed on a substrate, wherein a surface of the laminated body is a porous layer or a layer having a textured structure, and at least one layer of the laminated body is a polymer layer containing a linear polymer and a branched polymer. A method for manufacturing the optical member is also provided. The branched polymer content is 10% by weight or more and 90% by weight or less of the total weight of the linear polymer and (Continued)

the branched polymer. The layer having a textured structure contains crystals mainly composed of aluminum oxide.

15 Claims, 13 Drawing Sheets

(51) Int. Cl.
  *C09D 5/00* (2006.01)
  *C09D 179/06* (2006.01)
  *C09D 179/08* (2006.01)
  *C09D 161/28* (2006.01)
  *C08G 73/10* (2006.01)
  *C03C 3/085* (2006.01)
  *C03C 3/087* (2006.01)
  *C03C 3/097* (2006.01)
  *B05D 1/18* (2006.01)
  *B05D 1/38* (2006.01)
  *C09D 1/00* (2006.01)
  *G02B 1/115* (2015.01)

(52) U.S. Cl.
  CPC ... *C03C 2217/77* (2013.01); *Y10T 428/24355* (2015.01)

OPTICAL MEMBER, METHOD FOR MANUFACTURING OPTICAL MEMBER, AND OPTICAL FILM OF OPTICAL MEMBER

CROSS-REFERENCE TO RELATED APPLICATIONS

This application is a divisional of U.S. patent application Ser. No. 13/860,988 filed Apr. 11, 2013, which claims the benefit of Japanese Patent Application No. 2012-093068 filed Apr. 16, 2012, each of which is hereby incorporated by reference herein in their entirety.

BACKGROUND OF THE INVENTION

Field of the Invention

The present invention relates to an antireflection optical member, a method for manufacturing the optical member, and an optical film of the optical member and more particularly to an optical member having high antireflection performance from a visible region to a near-infrared region and a method for manufacturing the optical member.

Description of the Related Art

In an antireflection structure having a fine periodic structure having a pitch less than or equal to a wavelength in a visible light region, it is known that the formation of a fine periodic structure having an appropriate pitch and height results in high antireflection performance in a wide wavelength range.

A known method for forming a fine periodic structure includes the application of a film in which fine particles having a particle size less than or equal to the visible light wavelength are dispersed. A method for forming a fine periodic structure by patterning with a micromachining apparatus, such as an electron-beam lithography system, a laser interference exposure apparatus, a semiconductor exposure apparatus, or an etching apparatus, is known to enable the control of pitch and height and allows the formation of an antireflection fine periodic structure (Japanese Patent Laid-Open No. 50-70040).

In accordance with another method, boehmite, which is an aluminum oxide hydroxide, is grown on a substrate to produce an antireflection effect. In accordance with these methods, an aluminum oxide film formed by a liquid phase method (sol-gel method) is subjected to steam treatment or hot-water immersion treatment to form a fine periodic structure of crystals, for example, made of boehmite on its surface layer, thereby forming an antireflection film (see K. Tadanaga, N. Katata, and T. Minami: "Super-Water-Repellent $Al_2O_3$ Coating Films with High Transparency", J. Am. Ceram. Soc., 80[4], 1040-42 (1997)).

When a substrate has a high refractive index, however, a sufficient antireflection effect cannot be produced with a fine periodic structure of aluminum oxide crystals alone. Thus, a layer having an intermediate refractive index between the refractive indexes of the substrate and the fine periodic structure is formed between the substrate and the fine periodic structure to improve the antireflection effect. In particular, a layer having an intermediate refractive index made of a transparent organic resin not only has an antireflection effect but also protects a glass substrate from damage caused by moisture or water vapor (see Japanese Patent Laid-Open No. 2008-233880).

In order to produce an antireflection film suitable for optical members made of a wide variety of glasses, such as high-refractive-index glasses, there is a demand for an optical thin film having an adjustable refractive index and small variations in film thickness and optical properties.

An antireflection porous film containing fine particles in its surface layer and a film having a textured structure containing aluminum oxide crystals are convenient and have high productivity and excellent optical performance. However, a large difference in refractive index between a substrate and these films results in an insufficient antireflection effect. A layer having an intermediate refractive index disposed between the substrate and the porous film or the film having the textured structure can improve the antireflection effect. However, the refractive index of the substrate varies greatly with the application of the substrate. Thus, there is a demand for a thin-film material that allows for a refractive index and a thickness suitable for the refractive index of the substrate. There is also a demand for an optical member having a high-performance antireflection film that has high in-plane uniformity.

SUMMARY OF THE INVENTION

In view of such background art, the present invention provides an antireflection optical member that has high in-plane uniformity and a method for manufacturing the optical member. The present invention also provides an optical film for use in the optical member.

To this end, the present invention provides an optical member having the following structure and a method for manufacturing the optical member.

An optical member that can solve the problems described above has a laminated body configured to reduce light reflection disposed on a substrate, wherein a surface of the laminated body is a porous layer or a layer having a textured structure, and at least one layer of the laminated body is a polymer layer containing a linear polymer and a branched polymer having a refractive index of 1.7 or more.

A method for manufacturing an optical member that can solve the problems described above is a method for manufacturing an optical member including a laminated body configured to reduce light reflection disposed on a substrate. This method includes 1) applying a polymer solution of a linear polymer and a branched polymer having a refractive index of 1.7 or more to a substrate or a thin film disposed on the substrate;

2) heating the applied polymer solution at 23° C. or more and 250° C. or less to form a polymer layer containing a mixture of the linear polymer and the branched polymer; and 3) forming a porous layer or a layer having a textured structure on the polymer layer.

An optical film of an optical member that can solve the problems described above, wherein the optical member includes a laminated body on a substrate. A surface of the laminated body includes a porous layer or a layer having a textured structure. The optical film is used in at least one layer of the laminated body and includes a polymer layer containing a linear polymer and a branched polymer having a refractive index of 1.7 or more.

The present invention can provide an antireflection optical member that has high in-plane uniformity and a method for manufacturing the optical member. The present invention can also provide an optical film for use in the optical member.

Further features of the present invention will become apparent from the following description of exemplary embodiments with reference to the attached drawings.

DESCRIPTION OF THE EMBODIMENTS

The present invention will be described in detail below.

An optical member according to an embodiment of the present invention includes a laminated body configured to reduce light reflection disposed on a substrate. A surface of the laminated body is a porous layer or a layer having a textured structure (projections), and at least one layer of the laminated body is a polymer layer containing a linear polymer and a branched polymer.

In an optical film of an optical member according to an embodiment of the present invention, the optical member includes a laminated body on a substrate. A surface of the laminated body includes a porous layer or a layer having a textured structure. The optical film is used in at least one layer of the laminated body and includes a polymer layer containing a linear polymer and a branched polymer.

Figure 1:
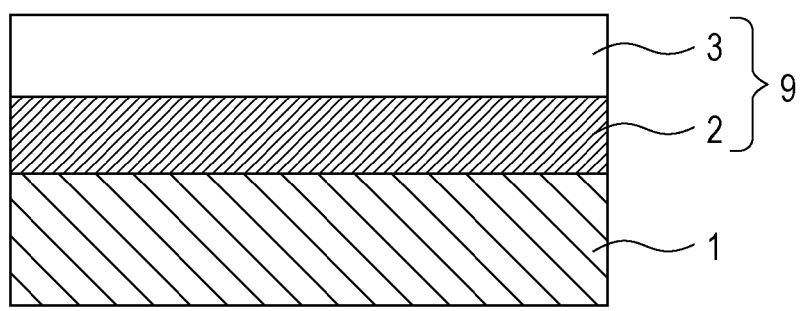
FIG. 1 is a schematic view of an optical member according to an embodiment of the present invention.

FIG. 1 is a schematic view of an optical member according to an embodiment of the present invention. In FIG. 1, an optical member according to an embodiment of the present invention includes a substrate 1, a polymer layer 2 disposed on the substrate 1, and a low-refractive-index layer 3 disposed on the polymer layer 2. The low-refractive-index layer 3 is a porous layer or a layer having a textured structure. The polymer layer 2 and the low-refractive-index layer 3 constitute a laminated body 9. An optical film of an optical member according to an embodiment of the present invention includes the polymer layer 2.

The laminated body 9 composed of the polymer layer 2 and the low-refractive-index layer 3 can reduce light reflection on the surface of the substrate 1. The polymer layer 2 contains a linear polymer and a branched polymer. Components of the polymer layer 2 other than the linear polymer and the branched polymer complement the polymers and are compatible with, can be mixed with, or can be dispersed in the polymer layer 2, provided that the components do not impair the characteristics of the polymers.

A large difference in refractive index between the substrate 1 and the low-refractive-index layer 3, which is a porous layer or a layer having a textured structure, results in strong reflection at their interface and a low antireflection effect. The formation of the polymer layer 2 between the substrate 1 and the low-refractive-index layer 3 can produce a higher antireflection effect than the formation of the low-refractive-index layer 3 directly on the substrate 1. The polymer layer 2 may have a thickness of 10 nm or more and 100 nm or less depending on the refractive index of the substrate. The polymer layer 2 having a thickness of less than 10 nm has little antireflection effect. The polymer layer 2 having a thickness of more than 100 nm has a markedly reduced antireflection effect.

The branched polymer of the polymer layer 2 has a branched molecular chain in its molecule. The branched polymer may be a multi-branched polymer, such as a dendrimer or a hyperbranched polymer. The branched polymer may be a branched polycarbonate, a branched polyamide, a branched polyimide, or a branched melamine polymer. Although a plurality of IC conjugated systems, such as aromatic rings, are generally introduced to increase refractive index, this significantly reduces solubility in the case of linear polymers. A branched polymer rarely has intermolecular entanglement of molecular chains because of the excluded volume effect of branched molecular chains. Thus, a branched polymer has a high degree of solubility in solvents, is easily compatible with another polymer, and is suitably used in combination with a linear polymer.

The branched polymer in the polymer layer 2 is effective in controlling the refractive index of the polymer layer 2. The branched polymer preferably has a refractive index of 1.7 or more, more preferably 1.7 or more and less than 2.0, at a wavelength of 550 nm. The branched polymer having a refractive index of less than 1.7 at a wavelength of 550 nm is not significantly effective in controlling the refractive index of the polymer layer 2. The branched polymer having a refractive index of 2.0 or more has strong absorption in a visible light region and reduces transmittance through the polymer layer 2.

The branched polymer in the polymer layer 2 may have a structure represented by the following general formula (1). This structure imparts a high refractive index and high heat resistance to the branched polymer.

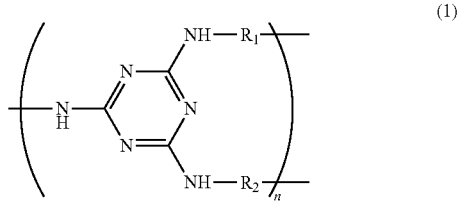

R1 and R2 independently denote a divalent organic group having an aromatic ring or a heterocycle, and n is an integer of 3 or more. Examples of the divalent organic group having an aromatic ring or a heterocycle include, but are not limited to, a phenylene group, a naphthylene group, and a biphenyl group.

The linear polymer in the polymer layer 2 has a molecular chain of repeated monomer units and has no branch point in the molecular chain. Entanglement of molecular chains of the linear polymer during film formation yields a dense and uniform film even in the case of a thin film having a thickness of submicron or less, such as the polymer layer 2.

Although having excellent solubility and compatibility, the branched polymer rarely has the entanglement of molecular chains and rarely yields a dense and uniform film. Thus, the branched polymer can be combined with a linear polymer, which can yields a dense and uniform film even in the case of a thin film, to form a uniform thin film.

The linear polymer for use in the polymer layer 2 may be any linear polymer that can be combined with the branched polymer. Examples of the linear polymer include, but are not limited to, acrylic polymers, melamine polymers, phenolic resins, polycarbonates, polyesters, polyarylates, polyethers, polyureas, polyurethanes, polyamides, polyamideimides, polyimides, polyketones, polysulfones, polyphenylenes, polyxylylenes, and polycycloolefins.

The linear polymer may have an aromatic ring and/or an imide ring in its main chain. The aromatic ring and the imide ring may have a structure represented by the following chemical formula.

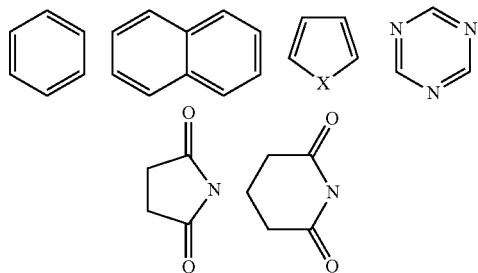

X = CH$_2$, N, S

The aromatic ring and the imide ring have a planar structure. Molecular chains of the linear polymer having such a structure in the main chain can be easily oriented in parallel with a substrate. Thus, the linear polymer is more effective in a thin film like the polymer layer 2 in terms of the uniformity of film thickness and refractive index. Furthermore, because of its high solvent resistance, glass transition temperature, and heat resistance, the linear polymer causes little variations in film thickness and refractive index.

Examples of the linear polymer having an aromatic ring and/or an imide ring in its main chain include, but are not limited to, aromatic polyethers, such as polyetherketones and polyethersulfones, aromatic polyesters, such as poly(ethylene terephthalate), aromatic polycarbonates, aromatic polyurethanes, aromatic polyureas, aromatic polyamides, and thermoplastic polyimides. Aromatic polyethers, aromatic polysulfides, aromatic polycarbonates, and polyimides have excellent heat resistance. The linear polymer may have a lower refractive index than the branched polymer, and a difference in refractive index between the linear polymer and the branched polymer may be 0.04 or more and 0.4 or less. When the difference in refractive index between the linear polymer and the branched polymer is less than 0.04, the branched polymer is not significantly effective in controlling the refractive index of the polymer layer 2. When the difference in refractive index between the linear polymer and the branched polymer is more than 0.4, this results in an excessively large refractive index difference and possibly impairs the in-plane uniformity of refractive index.

The branched polymer content is preferably 10% by weight or more and 90% by weight or less, more preferably 15% by weight or more and 85% by weight or less, of the total weight of the linear polymer and the branched polymer. A branched polymer content of less than 10% by weight may result in an insufficient amount of branched polymer for controlling the refractive index. A branched polymer content of more than 90% by weight may result in an uneven thickness of the polymer layer 2 because of an insufficient amount of linear polymer.

The linear polymer content is preferably 10% by weight or more and 90% by weight or less, more preferably 15% by weight or more and 85% by weight or less, of the total weight of the linear polymer and the branched polymer.

A method for manufacturing an optical member using a method for forming the polymer layer 2 will be described below.

A method for manufacturing an optical member according to an embodiment of the present invention is a method for manufacturing an optical member including a laminated body configured to reduce light reflection disposed on a substrate. This method includes 1) applying a polymer solution of a linear polymer and a branched polymer to a substrate or a thin film disposed on the substrate;

2) heating the applied polymer solution at 23° C. or more and 250° C. or less to form a polymer layer containing a mixture of the linear polymer and the branched polymer; and 3) forming a porous layer or a layer having a textured structure on the polymer layer.

The polymer layer 2 is formed as described below.

A polymer solution of a linear polymer and a branched polymer dissolved in a solvent is prepared in advance or immediately before use. The polymer solution can be prepared by dissolving a linear polymer powder and a branched polymer powder in the solvent. The polymer solution may also be prepared by mixing a linear polymer solution and a branched polymer solution or mixing reaction solutions after polymerization. The polymers in the linear polymer solution and the branched polymer solution may be polymer precursors. For example, when the linear polymer is a polyimide, the polymer in the solution may be a polyimide precursor, such as polyamic acid.

The solvent for use in the polymer solutions may be a solvent for dissolving both the linear polymer and the branched polymer. Examples of the solvent include, but are not limited to, ketones, such as 2-butanone, methyl isobutyl ketone, cyclopentanone, and cyclohexanone; esters, such as ethyl acetate, n-butyl acetate, ethylene glycol monomethyl ether acetate, propylene glycol monomethyl ether acetate, ethyl lactate, and γ-butyrolactone; ethers, such as tetrahydrofuran, dioxane, diisopropyl ether, dibutyl ether, cyclopentylmethyl ether, and diglyme; aromatic hydrocarbons, such as toluene, xylene, and ethylbenzene; chlorinated hydrocarbons, such as chloroform, methylene chloride, and tetrachloroethane; N-methylpyrrolidone; N,N-dimethylformamide; N,N-dimethylacetamide; dimethyl sulfoxide; and sulfolane. Alcohols, such as 1-butanol, methyl cellosolve, and methoxypropanol, may also be used in combination with the solvents described above.

The polymer layer 2 is formed by applying the polymer solution of the linear polymer and the branched polymer to a substrate or a thin film disposed on the substrate.

The polymer solution can be applied by a known method, such as dipping, spin coating, spraying, printing, or flow coating, or a combination thereof.

The applied polymer solution is dried and/or baked at 23° C. or more and 250° C. or less at normal pressure or under reduced pressure. The polymer solution is dried and/or baked for approximately five minutes to two hours principally in order to remove the solvent. The polymer solution may be heated by light, radiation, or electromagnetic wave irradiation using a circulating hot-air oven, a muffle furnace, infrared rays, or a microwave.

The polymer layer 2 may contain component(s) other than the linear polymer and the branched polymer, provided that the component(s) does not impair the optical properties, transparency, heat resistance, and water-fastness of the polymer layer 2. The amount of component(s) other than the linear polymer and the branched polymer is less than 20 parts by weight per 100 parts by weight of the linear polymer and the branched polymer. Twenty parts by weight or more of the component(s) other than the linear polymer and the branched polymer may impair the transparency, strength, and thickness uniformity of the polymer layer 2.

The component(s) other than the linear polymer and the branched polymer may be a silane coupling agent for improving adhesiveness or a phosphate. A phenolic antioxidant may be added to the polymer layer 2 in order to reduce coloring during heat treatment. A thermosetting resin, a photocurable resin, and/or a cross-linker, such as an epoxy resin, a melamine resin, and/or an acrylic resin, may be added to the polymer layer 2 in order to improve the solvent resistance of the polymer layer 2. A small amount of inorganic fine particles, such as $SiO_2$, $TiO_2$, $ZrO_2$, ZnO, MgO, and/or $Al_2O_3$, may be added to the polymer layer 2 in order to control the refractive index or increase the hardness of the polymer layer 2.

The low-refractive-index layer 3, which is a porous layer or a layer having a textured structure, disposed on the polymer layer 2 may have a refractive index of 1.4 or less at a wavelength of 550 nm and may be composed of a metal oxide, a metal halide, or a fluoropolymer.

The porous layer may be a layer of fine particles or hollow particles made of silicon oxide or magnesium fluoride. A dispersion liquid of fine particles dispersed in water or a solvent may be applied to the polymer layer 2 by spin coating. Voids between particles can reduce the density and consequently the refractive index of the resulting layer. The porous layer preferably has a thickness of 30 nm or more and 300 nm or less, more preferably 50 nm or more and 200 nm or less.

The layer having a textured structure serving as the low-refractive-index layer 3 has an infinite number of projections on its surface. The layer having a textured structure is an antireflection film that has a nano structure of a certain material and that has an apparent refractive index changing in the thickness direction of the film. The apparent refractive index is lower than the intrinsic refractive index of the material. For example, the layer having a textured structure has a nano structure of a material containing a metal oxide or a metallic compound and has an apparent refractive index that changes in the thickness direction of the layer, the apparent refractive index being lower than the intrinsic refractive index of the material.

More specifically, the layer having a textured structure has a fine structure having a smaller dimension than the operating wavelength of an optical component to which the antireflection film is applied. The fine structure has a plurality of closed spaces isolated from the outside atmosphere or open spaces in communication with the outside atmosphere. Thus, the antireflection film has a refractive index lower than the refractive index of the material (the intrinsic refractive index of the material) of the antireflection film and thereby has a reduced apparent refractive index. In other words, the intrinsic refractive index of the material is the refractive index of a non-porous thin film or a bulk of the material, and the apparent refractive index is a reduced refractive index of a film having the fine structure containing spaces.

The apparent refractive index changes as the occupancy of the spaces or a solid portion in the film changes in the thickness direction.

Figure 2:
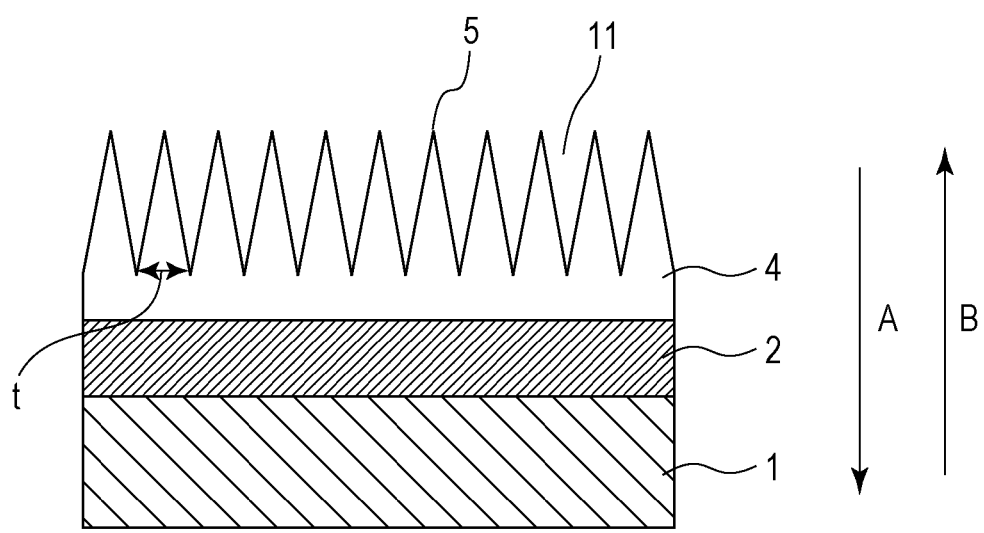
FIG. 2 is a schematic view of an optical member according to another embodiment of the present invention.

FIG. 2 is a schematic cross-sectional view of an antireflection film according to an embodiment of the present invention. The antireflection film includes a solid portion (textured structure) 5 and a space 11. The apparent refractive index may be increased stepwise or continuously in the traveling direction of light (arrow A). The apparent refractive index may be decreased stepwise or continuously in the traveling direction of light (arrow B). The refractive index may be approximately 1 on the outermost surface of the antireflection film in contact with the outside atmosphere and may be increased and approach the intrinsic refractive index of the material of the antireflection film (for example, 1.4 to 3.0) in the thickness direction of the antireflection film.

The antireflection film may include at least two layers of a fine structure having different space or solid portion occupancies or may have distribution in space or solid portion occupancy. The outermost surface of the antireflection film has a fine textured structure with the thickness (t) of each raised portion (projection) being smaller than the operating wavelength, more specifically, being in the order of nanometer.

Figure 15:
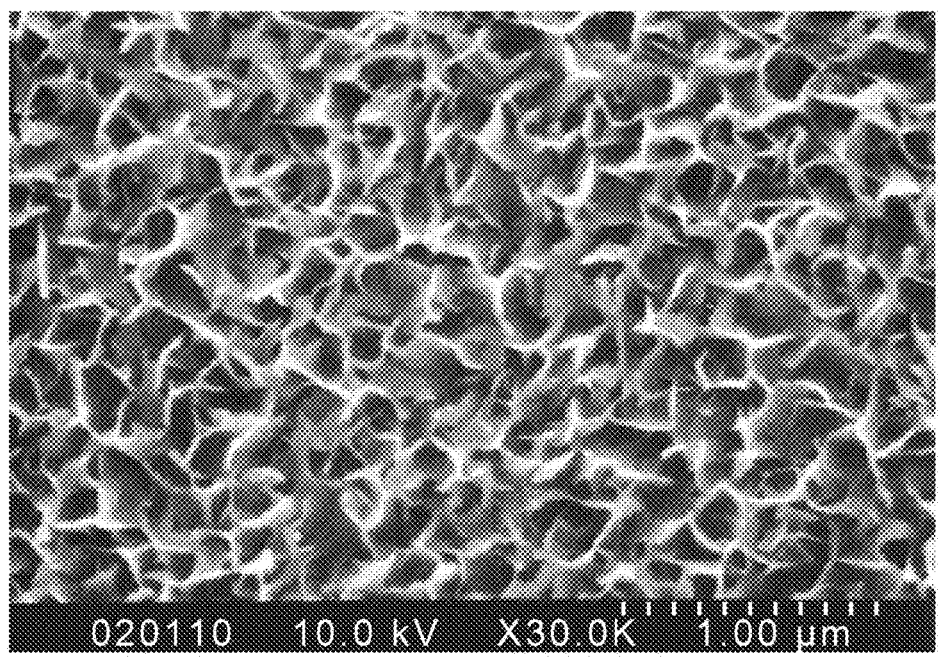
FIG. 15 is an enlarged electron micrograph of a surface of an optical member according to another embodiment of the present invention.

Such a fine textured structure is referred to as moth-eye, a subwavelength structure (SWS), petal-shaped, woven, spinous, or whiskers (see FIGS. 2 and 15, Japanese Patent Laid-Open No. 09-202649, Japanese Patent Laid-Open No. 2005-275372, and Japanese Patent Laid-Open No. 2006-259711). FIG. 15 is an enlarged electron micrograph of a surface of an optical member according to another embodiment of the present invention.

The material of the solid portion may be a metallic compound, for example, a metal oxide, such as silicon oxide, zinc oxide, titanium oxide, magnesium oxide, zirconium oxide, or aluminum oxide, a metal fluoride, such as magnesium fluoride, a metal fluoride oxide, or a metal hydroxide. The material of the solid portion may contain at least one of these substances. The material of the solid portion may contain more than one metallic elements, for example, a multi-element metallic compound of a binary system or a ternary system.

The material of the solid portion may contain phosphorus and/or boron.

The crystal structure of the solid portion is not particularly limited and may be amorphous, microcrystalline, polycrystalline, or monocrystalline. Alternatively, the solid portion may contain microcrystals, polycrystals, and/or single crystals in an amorphous material.

The antireflection film may be manufactured by applying surface treatment, such as heat treatment or hot water treatment, to a solid film formed by a gas phase method, such as vacuum evaporation, sputtering, or chemical vapor deposition (CVD), a sol-gel method, or a liquid phase method, such as coating or spraying, to form a fine textured structure on the solid film.

For example, an amorphous aluminum oxide film formed on a substrate by a sol-gel method can be immersed in hot water to grow plate crystals of an oxide of aluminum called boehmite, a hydroxide of aluminum, or a hydrate thereof, forming a petal-shaped fine textured structure.

The polymer layer 2 is disposed as an intermediate layer between the antireflection film having such a fine textured structure and the substrate. The intermediate layer may be a plurality of layers, a plurality of polymer layers according to an embodiment of the present invention, or a layer other than the polymer layers according to the present invention. The layer other than the polymer layers according to the present invention may be a solid film having an intermediate refractive index between the apparent refractive index of the antireflection film and the refractive index of the substrate. More specifically, an inorganic substance, such as a metallic compound described above as the material of the antireflection film, or an organic substance, such as resin exemplified by polyimide, may be used.

The textured structure is formed of aluminum oxide, silicon oxide, a transparent polymer, and other component(s). Because of voids in the textured structure, the low-refractive-index layer has a refractive index distribution in the thickness direction and a high antireflection effect.

FIG. 2 is a schematic view of an optical member according to another embodiment of the present invention. In FIG. 2, the optical member includes a substrate 1, a polymer layer 2 disposed on the substrate 1, and a layer 4 having a textured structure 5 disposed on the polymer layer 2. The textured structure 5 may be formed of aluminum oxide crystals. The term "aluminum oxide crystals", as used herein, refers to crystals deposited and grown on a surface of a layer mainly composed of aluminum oxide by immersing the layer in hot water to peptize the surface of the layer.

Figure 3:
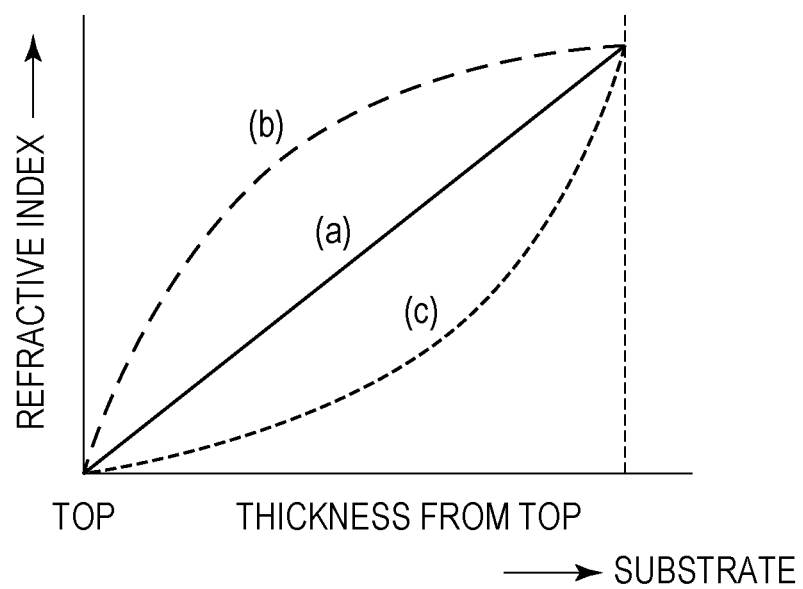
FIG. 3 is a graph of the refractive index distribution of an optical member according to another embodiment of the present invention.

As illustrated in FIG. 3, the refractive index of the layer 4 having the textured structure may continuously increase from the top toward the substrate in a linear (a) or curved (b or c) manner. The layer 4 having a refractive index that continuously increases from the top toward the substrate has a higher reflectance-reduction effect than a plurality of layers in which the refractive index increases layer by layer from the top.

The layer 4 having the textured structure is formed of crystals mainly composed of an oxide or hydroxide of aluminum or a hydrate thereof. In particular, the crystals may be formed of boehmite. An oxide of aluminum, a hydroxide of aluminum, and hydrates of these compounds are hereinafter collectively referred to as aluminum oxide. An upper end of randomly arranged large and small crystals forms the textured structure 5. Thus, the precipitation and growth of the crystals are needed to be controlled to change the height, size, angle, and intervals of projections of the textured structure 5. The layer 4 having the textured structure may be divided into the textured structure 5 and its lower layer. The lower layer may be formed of aluminum oxide alone or aluminum oxide and 30% by mole or less $ZrO_2$, $SiO_2$, $TiO_2$, ZnO, and/or MgO.

Figure 4:
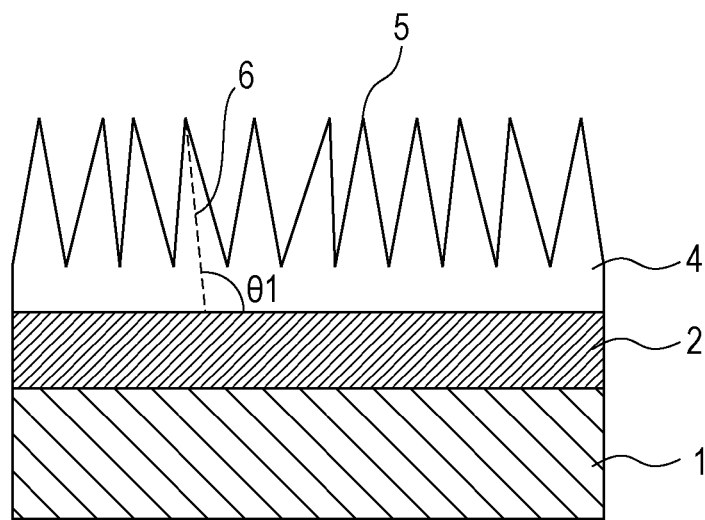
FIG. 4 is a schematic view of an optical member according to another embodiment of the present invention.

FIG. 4 illustrates a substrate 1 having a flat surface, such as a plate, a film, or a sheet. It is desirable that the average of the angles θ1 between slopes 6 in the textured structure 5 and the substrate surface be 45 degrees or more and 90 degrees or less, preferably 60 degrees or more and 90 degrees or less.

Figure 5:
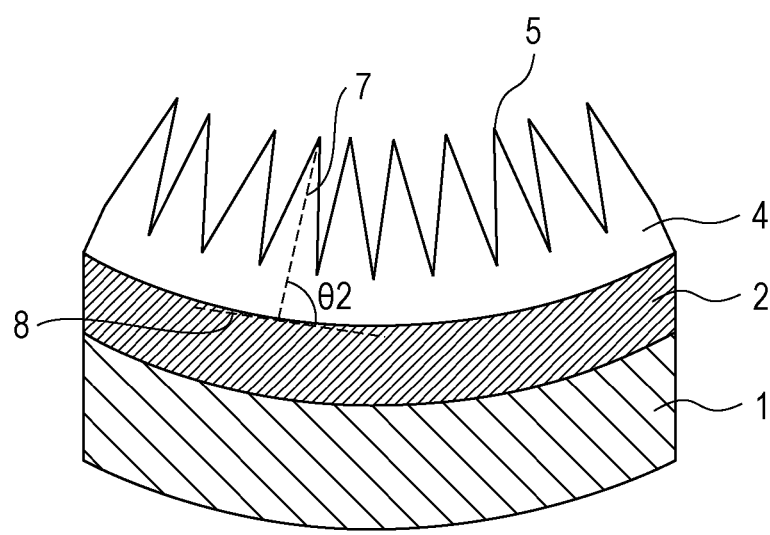
FIG. 5 is a schematic view of an optical member according to another embodiment of the present invention.

FIG. 5 illustrates a substrate 1 having a two-dimensionally or three-dimensionally curved surface. It is desirable that the average of the angles θ2 between slopes 7 in the textured structure 5 and a tangent line 8 of the substrate surface be 45 degrees or more and 90 degrees or less, preferably 60 degrees or more and 90 degrees or less. When the angle θ1 or θ2 is more than 90 degrees, its supplementary angle is used.

The thickness of the layer 4 having the textured structure is preferably 20 nm or more and 1000 nm or less, more preferably 50 nm or more and 1000 nm or less. When the thickness of the layer 4 having the textured structure is 20 nm or more and 1000 nm or less, the textured structure 5 has effective antireflection performance, maintains mechanical strength, and has advantages in manufacturing costs. When the thickness of the layer 4 having the textured structure is 50 nm or more and 1000 nm or less, the antireflection performance is further improved.

The surface density of the textured structure 5 is also important and can be represented by the average surface roughness Ra' and the surface area ratio Sr, which is defined later. The average surface roughness Ra' can be determined by applying the measurement of center-line average roughness to the surface. The average surface roughness Ra' is 5 nm or more, preferably 10 nm or more, more preferably 15 nm or more and 100 nm or less. The surface area ratio Sr is 1.1 or more, preferably 1.15 or more, more preferably 1.2 or more and 3.5 or less.

The surface density of the textured structure 5 can be determined with a scanning probe microscope (SPM). The average surface roughness Ra', which is determined by applying the measurement of center-line average roughness Ra to the surface, and the surface area ratio Sr of the layer 4 having the textured structure can be determined by SPM observation. More specifically, the average surface roughness Ra' (nm) can be determined by three-dimensionally applying the measurement of center-line average roughness Ra defined by JIS B 0601 to a surface to be measured. The average surface roughness Ra' refers to "the average of the absolute values of deviations of specified planes from the reference plane" and is expressed by the following equation (1):

$$Ra' = \frac{1}{S_0} \int_{Y_B}^{Y_T} \int_{X_L}^{X_R} |F(X, Y) - Z_0| d_X d_Y \qquad \text{Equation (1)}$$

wherein

Ra': average surface roughness (nm);

$S_0$: the area of a surface to be measured, on the assumption that the surface is flat, $|X_R-X_L| \times |Y_T-Y_B|$;

F(X,Y): a height at a point of measurement (X,Y), wherein X denotes the x-coordinate, and Y denotes the y-coordinate;

$X_L$ to $X_R$: the range of the surface to be measured on the x-coordinate;

$Y_B$ to $Y_T$: the range of the surface to be measured on the y-coordinate; and $Z_0$: the average height of the surface to be measured.

The surface area ratio Sr can be determined by $Sr=S/S_0$ wherein $S_0$ denotes the area of a surface to be measured, on the assumption that the surface is flat, and S denotes the actual surface area of the surface to be measured. The actual surface area of the surface to be measured is determined as described below. First, the surface to be measured is divided into minute triangles defined by adjacent three data points (A, B, and C). The area ΔS of each of the minute triangles is then determined using a vector product. $\Delta S(\Delta ABC)=[s(s-AB)(s-BC)(s-AC)]0.5$, wherein AB, BC, and AC denote the lengths of their respective sides. $s=0.5 (AB+BC+AC)]$. The surface area S is the sum total of ΔS's. When the surface density of the textured structure 5 is such that Ra' is 5 nm or more and Sr is 1.1 or more, the textured structure 5 can exhibit antireflection. Ra' of 10 nm or more and Sr of 1.15 or more result in a higher antireflection effect. When Ra' is 15 nm or more and Sr is 1.2 or more, the fine textured structure is actually useful. When Ra' is 100 nm or more and Sr is 3.5 or more, however, scattering due to the textured structure 5 predominates over the antireflection effect, resulting in poor antireflection performance.

A method for forming the layer 4 having the textured structure in the present invention may include 4) forming a layer mainly composed of aluminum oxide, and 5) bringing the layer mainly composed of aluminum oxide into contact with hot water or water vapor to precipitate crystals mainly composed of aluminum oxide.

The layer mainly composed of aluminum oxide can be formed on the polymer layer 2 by a known gas phase method, such as chemical vapor deposition (CVD) or physical vapor deposition (PVD), a known liquid phase method, such as a sol-gel method, or a known hydrothermal synthesis using an inorganic salt. A gel film formed by the application of a precursor sol of aluminum oxide can be treated with hot water to grow aluminum oxide crystals of a textured structure. This method can form a uniform antireflection layer on a large-area or nonplanar substrate.

The raw material of the gel film formed from the precursor sol of aluminum oxide contains an Al compound alone or an Al compound and at least one compound selected from Zr, Si, Ti, Zn, and Mg compounds. Metal alkoxides and salt compounds, such as chlorides and nitrates, may be used as the raw materials for $Al_2O_3$, $ZrO_2$, $SiO_2$, $TiO_2$, ZnO, and MgO. In particular, metal alkoxides may be used as $ZrO_2$, $SiO_2$, and $TiO_2$ raw materials because of their excellent film-forming properties.

Examples of the aluminum compound include, but are not limited to, aluminum ethoxide, aluminum isopropoxide, aluminum n-butoxide, aluminum sec-butoxide, aluminum tert-butoxide, and aluminum acetylacetonate, oligomers thereof, aluminum nitrate, aluminum chloride, aluminum acetate, aluminum phosphate, aluminum sulfate, and aluminum hydroxide.

Specific examples of the zirconium alkoxide include, but are not limited to, zirconium tetramethoxide, zirconium tetraethoxide, zirconium tetra-n-propoxide, zirconium tetraisopropoxide, zirconium tetra-n-butoxide, and zirconium tetra-t-butoxide.

The silicon alkoxide may be represented by the general formula $Si(OR)_4$. R's may be the same or different and may independently denote a lower alkyl group, such as a methyl group, an ethyl group, a propyl group, an isopropyl group, a butyl group, or an isobutyl group.

Examples of the titanium alkoxide include, but are not limited to, tetramethoxytitanium, tetraethoxytitanium, tetra-n-propoxytitanium, tetraisopropoxytitanium, tetra-n-butoxytitanium, and tetraisobutoxytitanium.

Examples of the zinc compound include, but are not limited to, zinc acetate, zinc chloride, zinc nitrate, zinc stearate, zinc oleate, and zinc salicylate, particularly zinc acetate and zinc chloride.

Examples of the magnesium compound include, but are not limited to, magnesium alkoxides, such as dimethoxymagnesium, diethoxymagnesium, dipropoxymagnesium, and dibutoxymagnesium, magnesium acetylacetonate, and magnesium chloride.

The organic solvent may be any organic solvent that does not induce the gelation of the raw materials described above, such as alkoxides. Examples of the organic solvent include, but are not limited to, alcohols, such as methanol, ethanol, 2-propanol, butanol, pentanol, ethylene glycol, and ethylene glycol mono-n-propyl ether; aliphatic or alicyclic hydrocarbons, such as n-hexane, n-octane, cyclohexane, cyclopentane, and cyclooctane; aromatic hydrocarbons, such as toluene, xylene, and ethylbenzene; esters, such as ethyl formate, ethyl acetate, n-butyl acetate, ethylene glycol monomethyl ether acetate, ethylene glycol monoethyl ether acetate, and ethylene glycol monobutyl ether acetate; ketones, such as acetone, methyl ethyl ketone, methyl isobutyl ketone, and cyclohexanone; ethers, such as dimethoxyethane, tetrahydrofuran, dioxane, and diisopropyl ether; chlorinated hydrocarbons, such as chloroform, methylene chloride, carbon tetrachloride, and tetrachloroethane; and aprotic polar solvents, such as N-methylpyrrolidone, dimethylformamide, dimethylacetamide, and ethylene carbonate. Among the solvents described above, alcohols can provide particularly excellent solution stability. Among the solvents described above, alcohols can provide particularly excellent solution stability.

Among the alkoxide raw materials, aluminum, zirconium, and titanium alkoxides have particularly high reactivity to water and are abruptly hydrolyzed by the action of moisture in the air or the addition of water, producing turbidity and precipitation in the solution. Aluminum salt compounds, zinc salt compounds, and magnesium salt compounds are difficult to dissolve in organic solvents and provide low solution stability. To avoid these problems, a stabilizer may be added to stabilize the solution.

Examples of the stabilizer include, but are not limited to, β-diketone compounds, such as acetylacetone, dipivaloylmethane, trifluoroacetylacetone, hexafluoroacetylacetone, benzoylacetone, dibenzoylmethane, 3-methyl-2,4-pentanedione, and 3-ethyl-2,4-pentanedione; β-ketoester compounds, such as methyl acetoacetate, ethyl acetoacetate, allyl acetoacetate, benzyl acetoacetate, iso-propyl acetoacetate, tert-butyl acetoacetate, iso-butyl acetoacetate, 2-methoxyethyl acetoacetate, and 3-keto-methyl n-valerate; and alkanolamines, such as monoethanolamine, diethanolamine, and triethanolamine. The molar ratio of the stabilizer to an alkoxide or a salt compound can be approximately one. After the addition of the stabilizer, a catalyst can be added to promote part of reactions to form a desired precursor. Examples of the catalyst include, but are not limited to, nitric acid, hydrochloric acid, sulfuric acid, phosphoric acid, acetic acid, and ammonia.

The precursor sol of aluminum oxide may be applied to the polymer layer 2 or a surface of the laminated body disposed on the polymer layer 2. The precursor sol can be applied by a known method, such as dipping, spin coating, spraying, printing, or flow coating, or a combination thereof.

A film of the precursor sol of aluminum oxide can be dried and/or baked at 60° C. or more and 250° C. or less, preferably 100° C. or more and 200° C. or less, to form an aluminum oxide layer. Although a higher heat-treatment temperature results in a greater density of the layer, a heat-treatment temperature higher than 250° C. may cause damage, such as deformation, to the substrate. The heating time depends on the heating temperature and may be 10 minutes or more.

The layer mainly composed of aluminum oxide formed on the polymer layer 2 by the method described above may be brought into contact with hot water or water vapor, for example, immersed in hot water or exposed to water vapor, to precipitate aluminum oxide crystals, thereby forming the textured structure 5 on the surface. In accordance with such a method, an amorphous aluminum oxide layer may remain in a lower portion of the textured structure 5 in the layer 4 having the textured structure.

A surface of the layer mainly composed of aluminum oxide in contact with hot water or water vapor is peptized, and some components are eluted from the layer. Because of a difference in hot-water solubility between hydroxides, crystals mainly composed of aluminum oxide are precipitated and grown on the surface layer. The temperature of hot water may be in the range of 40° C. to 100° C. The hot-water treatment time may be in the range of approximately 5 minutes to 24 hours.

Crystallization in the layer mainly composed of aluminum oxide to which an oxide, such as $TiO_2$, $ZrO_2$, $SiO_2$, ZnO, or MgO, is added as a different component utilizes a difference in hot-water solubility between the components. Unlike a layer composed of aluminum oxide alone, therefore, the ratios of inorganic components can be altered to control the size of the textured structure in a wide range. This allows the textured structure of the crystals to be controlled in the wide range described above. Use of ZnO as an accessory component allows eutectic crystallization with aluminum oxide. This allows the refractive index of the layer 4 having the textured structure to be controlled in a further wide range, thereby achieving excellent antireflection performance.

Examples of the material of the substrate 1 include, but are not limited to, glass, resin, glass mirrors, and resin mirrors. Representative examples of the resin substrate include, but are not limited to, films and formed products made of thermoplastic resins, such as polyester, cellulose triacetate, cellulose acetate, poly (ethylene terephthalate), polypropylene, polystyrene, polycarbonate, polysulfone, polyacrylate, polymethacrylate, ABS resin, poly (phenylene oxide), polyurethane, polyethylene, polycycloolefin, and poly (vinyl chloride); and cross-linked films and cross-linked formed products made of various thermosetting resins, such as unsaturated polyester resin, phenolic resin, cross-linking polyurethane, cross-linking acrylic resin, and cross-linking saturated polyester resin. Specific examples of the glass include, but are not limited to, non-alkali glass and aluminosilicate glass. A substrate for use in the present invention may be any substrate, such as a plate, a film, or a sheet, that can have a shape for each intended use and may have a two- or three-dimensionally curved surface. The thickness of the substrate is generally, but is not limited to, 5 mm or less.

An optical member according to an embodiment of the present invention may further include another functional layer. For example, a hard coat layer may be disposed on the layer 4 having the textured structure to improve film hardness. A water repellent layer, for example, formed of a fluoroalkylsilane or an alkylsilane may be formed to prevent the adhesion of dirt. An adhesive layer or a primer layer may be formed to improve the adhesion between the substrate and the layer mainly composed of aluminum oxide.

Optical members according to embodiments of the present invention can be used in various displays for use in word processors, computers, television sets, plasma display panels, and the like; polarizers for liquid crystal displays, and sunglass lenses, prescription glass lenses, viewing lens for cameras, prisms, fly-eye lenses, toric lenses, various optical filters, and sensors made of various optical lens materials and transparent plastics; imaging optical systems, optical systems for observation, such as binoculars, and projection optical systems for use in liquid crystal projectors; various optical lenses, such as scanning optical systems, for use in laser-beam printers; and covers for various measuring instruments and windowpanes for automobiles and trains.

EXAMPLES

The present invention will be further described in the following examples. However, the present invention is not limited to these examples. Optical films having a fine textured structure containing aluminum oxide crystals on their surfaces prepared in examples and comparative examples were evaluated as described below.

(1) Purification of 4,4'-Methylenebis(Aminocyclohexane)

Hexane was gradually added under reflux to 200 g of 4,4'-methylenebis(aminocyclohexane) (hereinafter referred to as DADCM, manufactured by Tokyo Chemical Industry Co., Ltd.). 4,4'-methylenebis(aminocyclohexane) was completely dissolved in hexane. After heating was completed, the solution was left to stand at room temperature for several days. A precipitate was filtered off and dried under vacuum. 61 g of purified DADCM was obtained as a white solid. The trans,trans-isomer content was 94% as measured by gas chromatography.

$^1$H-NMR (DMSO-$d_6$); δ 0.83 (2H,m), δ 0.97 (2H,q), δ 1.18 (2H,m), δ 1.60 (2H,d), δ 1.69 (2H,d), δ 2.05 (2H,s), δ 2.42 (2H,m), δ 3.30 (4H,b)

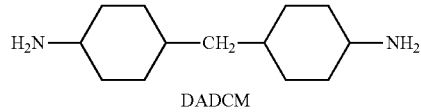 [SMILES: NC1CCC(CC2CCC(N)CC2)CC1]

DADCM (2) Synthesis of Polyimide a 3.98 g of 4,4'-bis(4-aminophenoxy)biphenyl (product name BAPB, manufactured by Wakayama Seika Kogyo Co., Ltd.) and 0.31 g of 1,3-bis(3-aminopropyl)tetramethyldisiloxane (product name PAM-E, manufactured by Shin-Etsu Chemical Co., Ltd.) were dissolved in 31 g of N,N-dimethylacetamide (hereinafter referred to as DMAc). While the diamine solution was cooled with water, 3.46 g of 4-(2,5-dioxotetrahydrofuran-3-yl)-1,2,3,4-tetrahydronaphthalene-1,2-dicarboxylic anhydride (product name TDA-100, manufactured by New Japan Chemical Co., Ltd.) was added to the diamine solution. The solution was stirred at room temperature for 15 hours to cause polymerization reaction. 58.1 g of DMAc, 3.8 g of pyridine, and 7.4 g of acetic anhydride were added to the solution, which was then stirred at room temperature for one hour. The solution was then stirred in an oil bath at 60° C. for four hours. A polymer was collected from the polymerization solution by reprecipitation in methanol and was washed with methanol several times. The polymer was dried at 100° C. under vacuum to yield 6.8 g (yield 93%) of polyimide a as a light yellow powder.

The imidization rate was 99.5% as determined by measuring the residual amount of carboxy group from a $^1$H-NMR spectrum.

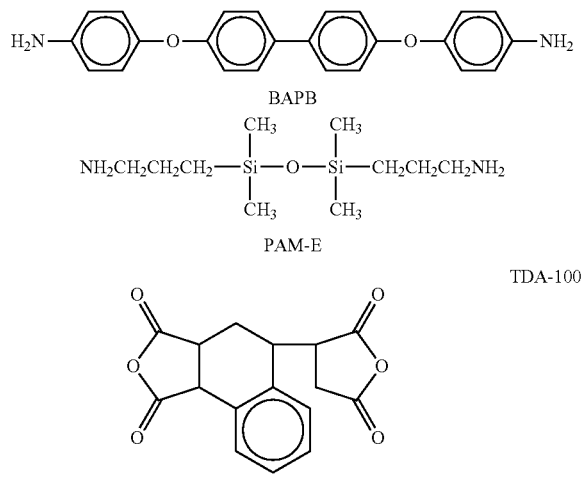

(3) Synthesis of Polyimide b 1.01 g of DADCM purified in (1), 1.77 g of BAPB, and 0.62 g of PAM-E were dissolved in 27.7 g of DMAc. While the diamine solution was cooled with water, 3.45 g of TDA-100 was added to the diamine solution. The solution was stirred at 50° C. for 3 hours and at room temperature for 15 hours to cause a polymerization reaction. 52 g of DMAc, 3.8 g of pyridine, and 7.4 g of acetic anhydride were added to the solution, which was then stirred at room temperature for one hour. The solution was then stirred in an oil bath at 80° C. for four hours. A polymer was collected from the polymerization solution by reprecipitation in methanol and was washed with methanol several times. The polymer was dried at 100° C. under vacuum to yield 6.1 g (yield 93%) of polyimide b as a light yellow powder.

The imidization rate was 99.1% as determined by measuring the residual amount of carboxy group from a $^1$H-NMR spectrum.

(4) Preparation of Precursor Sol of Aluminum Oxide 14.8 g of aluminum sec-butoxide (ASBD, manufactured by Kawaken Fine Chemicals Co., Ltd.), 3.42 g of 3-methyl-2,4-pentanedione, and 2-ethylbutanol were homogeneously mixed. 1.62 g of 0.01 M diluted hydrochloric acid was dissolved in a 2-ethylbutanol/1-ethoxy-2-propanol mixed solvent and was gradually added to the aluminum sec-butoxide solution. The solution was stirred for a short time. The mixing ratio of 2-ethylbutanol to 1-ethoxy-2-propanol in the mixed solvent was finally adjusted to 7/3. The solution was stirred in an oil bath at 120° C. for another two to three hours or more to prepare a precursor sol of aluminum oxide.

(5) Preparation of Sol of Silicon Oxide Fine Particles 10 g of ethyl silicate was dissolved in 100 ml of ethanol. 30 ml of aqueous ammonia was added to the solution. The solution was then stirred at room temperature for eight hours. 100 ml of 1-butanol was added to the solution. Water and ethanol were distilled off with an evaporator to yield a sol of silicon oxide fine particles.

(6) Measurement of Infrared Transmission Spectrum of Polymer Powder

An infrared transmission spectrum was measured from 650 to 4000 cm$^{-1}$ using an infrared spectrometer (Spectrum One, manufactured by PerkinElmer, Inc.) and an accompanying universal ATR.

(7) Cleaning of Substrate

Various glass substrates having a diameter of approximately 30 mm and a thickness of approximately 2 mm, both surfaces of each of which were polished, were ultrasonically cleaned with an alkaline detergent and isopropyl alcohol (IPA) and were dried in an oven.

(8) Measurement of Reflectance

Reflectance was measured with an absolute reflectometer (USPM-RU, manufactured by Olympus Corp.) at a wavelength in the range of 400 to 700 nm at an incident angle of 0 degrees. A minimum value of less than 0.05% was rated good (circle), and a minimum value of 0.05% or more was rated poor (cross). A mean value of less than 0.1% was rated good (circle), a mean value of 0.1% or more and less than 0.2% was rated fair (triangle), and a mean value of 0.2% or more was rated poor (cross).

(9) Transmission Observation

Light from a slide projector was passed through a film. The film was visually inspected for clouding. No clouding was rated good (circle), and clouding was rated poor (cross).

(10) Measurement of Film Thickness

The film thickness was measured with a spectroscopic ellipsometer (VASE, manufactured by J. A. Woollam Japan Co., Inc.) at a wavelength in the range of 380 to 800 nm.

(11) Measurement of Refractive Index

The refractive index was measured with a spectroscopic ellipsometer (VASE, manufactured by J. A. Woollam Japan Co., Inc.) at a wavelength in the range of 380 to 800 nm. The refractive index at a wavelength of 550 nm was employed.

(12) Observation of Substrate Surface

A substrate surface treated with Pd/Pt was observed with a field emission scanning electron microscope (FE-SEM) (S-4800, manufactured by Hitachi High-Technologies Corp.) at an accelerating voltage of 2 kV.

Example 1

A photo-curing paint of a branched melamine polymer (product name Hypertech UR101, manufactured by Nissan Chemical Industries, Ltd.) was diluted with a cyclopentanone/cyclohexanone mixed solvent to a concentration of 2.9% by weight to prepare a branched melamine polymer c solution.

Figure 6:
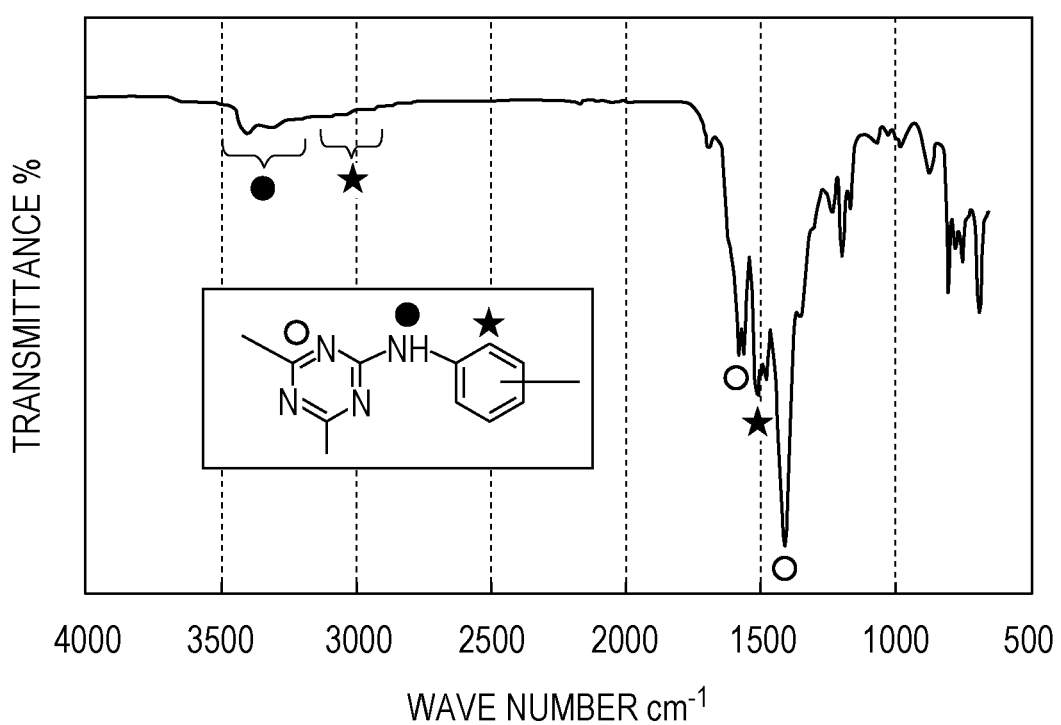
FIG. 6 is a graph of the infrared transmission spectrum of a branched melamine polymer c used in Examples 1, 3, 4, 5, 7, and 8 and Comparative Examples 1 and 3.

A powder was obtained by scraping a film of the photo-curing paint. The infrared transmission spectrum of the powder was measured. FIG. 6 is a graph of the infrared transmission spectrum of the branched melamine polymer c. The infrared transmission spectrum in FIG. 6 shows that the branched melamine polymer c contains a branched melamine polymer having a repeating structure represented by the following general formula (2) (wherein R3 and R4 independently denote a divalent organic group having an aromatic ring, such as a phenylene group).

A polyimide a having the following general formula (3), which was used as a linear polymer, was dissolved in a cyclopentanone/cyclohexanone mixed solvent to prepare a polyimide a solution having a concentration of 2.1% by weight.

The branched melamine polymer c solution was mixed with the polyimide a solution at room temperature to yield a mixed solution of the polyimide a and the branched melamine polymer c. The following six polymer solutions were prepared: four mixed solutions having different branched melamine polymer c contents, the polyimide a solution, and the branched melamine polymer c solution.

A proper amount of polymer solution was dropped on a polished surface of a cleaned glass A substrate, which was mainly composed of $La_2O_5$ and had a refractive index nd=1.88 at a wavelength of 587.6 nm and an Abbe number vd=41. After spin coating at 4000 to 5000 rpm for 20 seconds, the substrate was heated at 140° C. for 30 minutes to form a polymer layer having a thickness in the range of approximately 45 to 50 nm. The polymer layer other than a polyimide a layer was irradiated with light from an ultra-high-pressure mercury lamp at an illuminance of 13 mW for 70 seconds to cure the polymer layer. The following six polymer layers were formed: the polyimide a layer, mixed layers having a branched melamine polymer c content of 16%, 29%, 45%, or 60% by weight, and a branched melamine polymer c layer.

Figure 7:
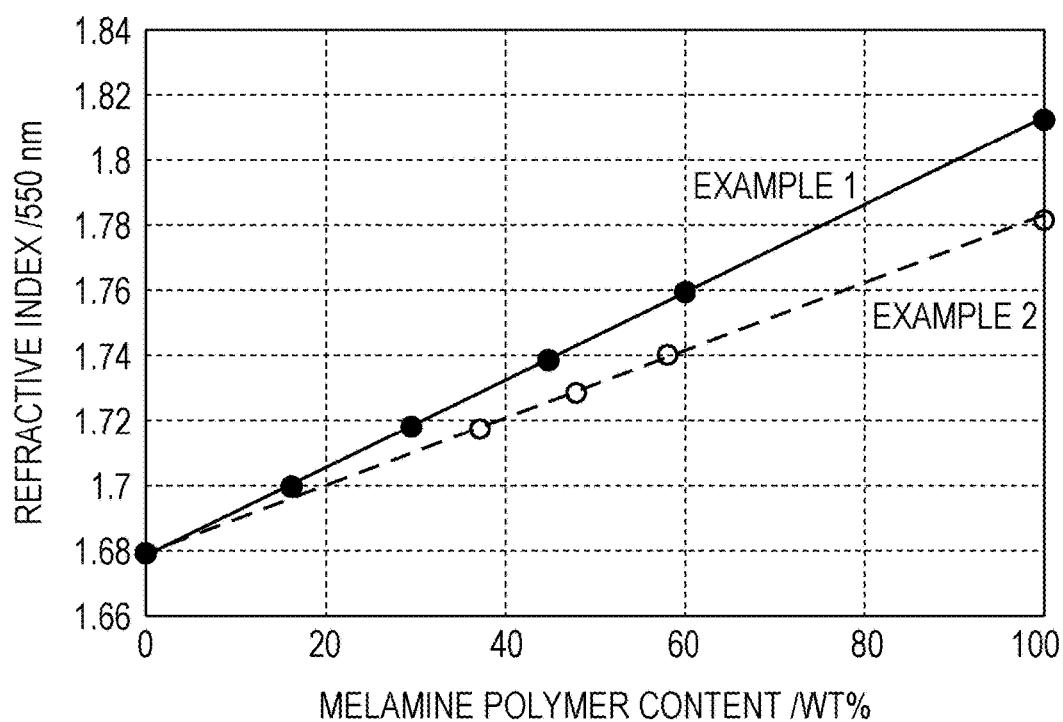
FIG. 7 is a graph showing the relationship between the branched melamine polymer content of a mixed layer of a polyimide a and a branched melamine polymer and the refractive index of the mixed layer in Examples 1 and 2.

The refractive index of the polymer layer was measured at a wavelength of 550 nm. FIG. 7 is a graph showing the relationship between the branched melamine polymer content (% by weight) of a polymer layer and the refractive index of the polymer layer. FIG. 7 shows that the refractive indexes of the mixed layers of the polyimide a and the branched melamine polymer c were plotted on a straight line between the refractive index of the polyimide a layer (1.680) and the refractive index of the branched melamine polymer c layer (1.813).

Table 1 summarizes the results of Examples 1 to 10 and Comparative Examples 1 to 3.

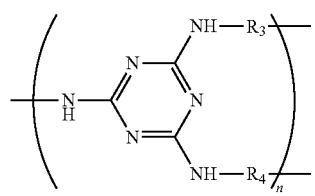

(2)

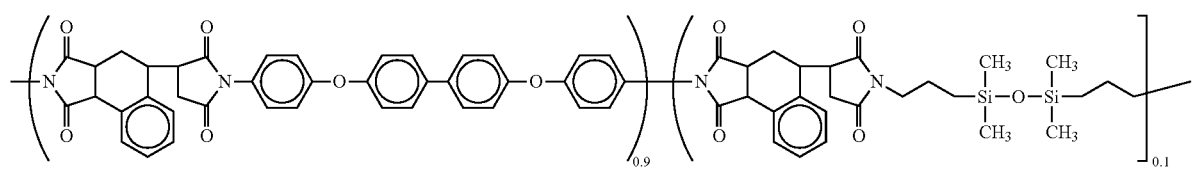

(3)

TABLE 1

|  | Linear polymer | | Branched polymer | | Refractive index of polymer layer | Glass substrate | Porous layer | Transmission observation | Reflectance % | |
|---|---|---|---|---|---|---|---|---|---|---|
|  | Type | Content (wt %) | Branched polymer | Content (wt %) |  |  |  |  | Minimum | Mean |
| Example 1 | Polyimide a | 84 | Branched melamine polymer c | 16 | 1.700 | Glass A nd = 1.88 | — | ○ | — | — |
|  |  | 71 |  | 29 | 1.718 |  |  | ○ | — | — |
|  |  | 55 |  | 45 | 1.739 |  |  | ○ | — | — |
|  |  | 40 |  | 60 | 1.760 |  |  | ○ | — | — |
| Example 2 | Polyimide a | 63 | Branched melamine polymer d | 37 | 1.718 |  | — | ○ | — | — |
|  |  | 52 |  | 48 | 1.729 |  |  | ○ | — | — |
|  |  | 42 |  | 58 | 1.740 |  |  | ○ | — | — |
| Example 3 | Polyimide b | 68 | Branched melamine polymer c | 32 | 1.677 |  | — | ○ | — | — |
|  |  | 37 |  | 63 | 1.738 |  |  | ○ | — | — |
| Example 4 | Polycarbonate | 59 | Branched melamine polymer c | 41 | 1.676 |  | — | ○ | — | — |
|  |  | 32 |  | 68 | 1.737 |  |  | ○ | — | — |
|  |  | 19 |  | 81 | 1.768 |  |  | ○ | — | — |
| Example 5 | Polyimide a | 55 | Branched melamine polymer c | 45 | 1.739 | Glass B nd = 2.00 | Layer having projections of aluminum oxide crystals | ○ | 0.04 | 0.08 |
| Example 6 | Polyimide a | 42 | Branched melamine polymer d | 58 | 1.740 |  | Layer having projections of aluminum oxide crystals | ○ | 0.03 | 0.07 |
| Example 7 | Polyimide b | 37 | Branched melamine polymer c | 63 | 1.738 |  | Layer having projections of aluminum oxide crystals | ○ | 0.03 | 0.07 |

TABLE 1-continued

| | Linear polymer | | Branched polymer | | Refractive index of polymer layer | Glass substrate | Porous layer | Transmission observation | Reflectance % | |
| --- | --- | --- | --- | --- | --- | --- | --- | --- | --- | --- |
| | Type | Content (wt %) | Branched polymer | Content (wt %) | | | | | Minimum | Mean |
| Example 8 | Polyimide a | 55 | Branched melamine polymer c | 45 | 1.741 | | Porous layer of silicon oxide | ○ | ○ 0.03 | Δ 0.17 |
| Comparative example 1 | — | — | Branched melamine polymer c | 100 | 1.813 | Glass B nd = 2.00 | Layer having projections of aluminum oxide crystals | ○ | X 0.07 | Δ 0.17 |
| Comparative example 2 | — | — | Branched melamine polymer d | 100 | 1.782 | | Layer having projections of aluminum oxide crystals | ○ | X 0.1 | Δ 0.18 |
| Comparative example 3 | — | — | Branched melamine polymer c | 100 | 1.816 | | Porous layer of silicon oxide | ○ | X 0.06 | X 0.35 |
| Comparative example 4 | Polyimide a | 100 | — | — | 1.680 | | Layer having projections of aluminum oxide crystals | ○ | X 0.08 | X 0.22 |

Example 2

A heat-curing paint of a branched melamine polymer (product name Hypertech UR202, manufactured by Nissan Chemical Industries, Ltd.) was diluted with a cyclopentanone/cyclohexanone mixed solvent to a concentration of 2.9% by weight to yield a branched melamine polymer d solution.

Figure 8:
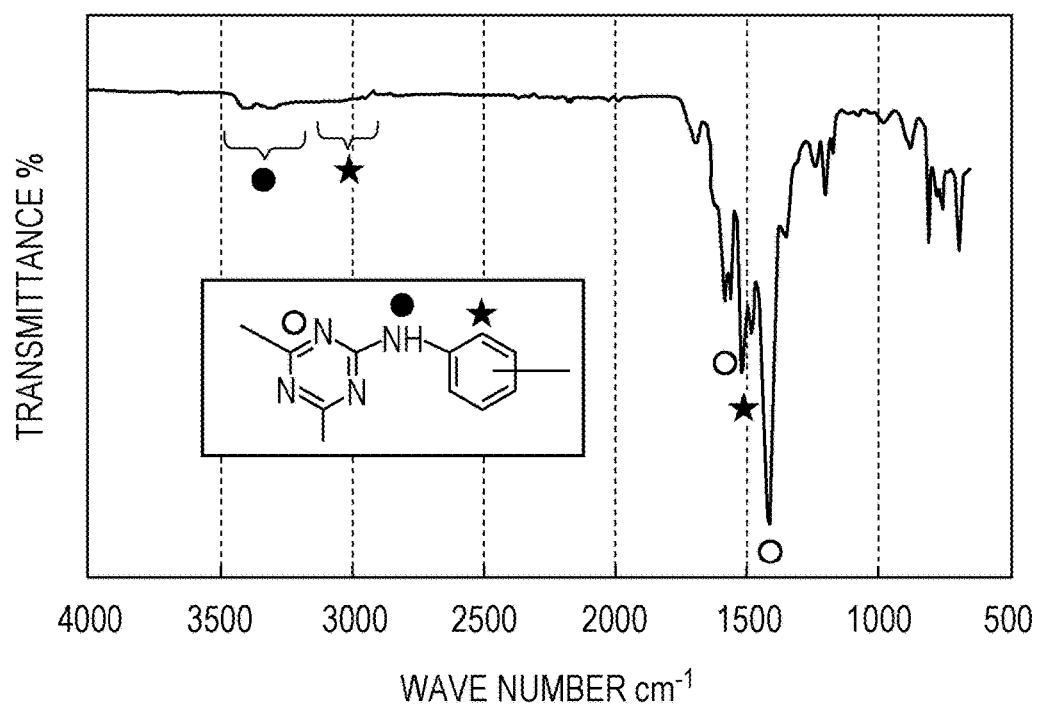
FIG. 8 is a graph of the infrared transmission spectrum of a branched melamine polymer d used in Examples 2 and 6 and Comparative Example 2.

A powder was obtained by scraping a film of the heat-curing paint. The infrared transmission spectrum of the powder was measured. FIG. 8 is a graph of the infrared transmission spectrum of the branched melamine polymer d. The infrared transmission spectrum in FIG. 8 shows that the branched melamine polymer d contains a branched melamine polymer having a repeating structure represented by the following general formula (4) (wherein R5 and R6 denote a divalent organic group having an aromatic ring, such as a phenylene group).

The branched melamine polymer d solution was mixed with the polyimide a solution at room temperature to yield a blend solution of the polyimide a and the branched melamine polymer d. The following five polymer solutions were prepared: three blend solutions having different branched melamine polymer d contents, the polyimide a solution, and the branched melamine polymer d solution.

The same procedures as in Example 1 were performed except that the temperature of heating after spin coating was changed from 140° C. to 200° C. and photoirradiation was not performed. The resulting polymer layers had a thickness in the range of approximately 45 to 50 nm and were the following five uniform layers: a polyimide a layer, three mixed layers having a branched melamine polymer d content of 37% by weight, 48% by weight, or 58% by weight, and a branched melamine polymer d layer. FIG. 7 is a graph showing the relationship between the branched melamine polymer d content (% by weight) of a polymer layer and the refractive index of the polymer layer. FIG. 7 shows that the refractive indexes of the mixed layers of the polyimide a and the branched melamine polymer d were plotted on a straight line between the refractive index of the polyimide a layer (1.680) and the refractive index of the branched melamine polymer d layer (1.782).

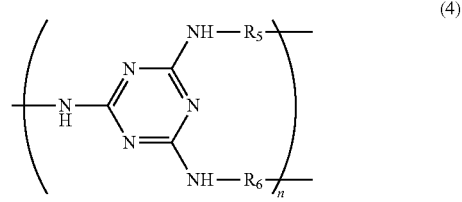

(4)

Example 3

Figure 9:
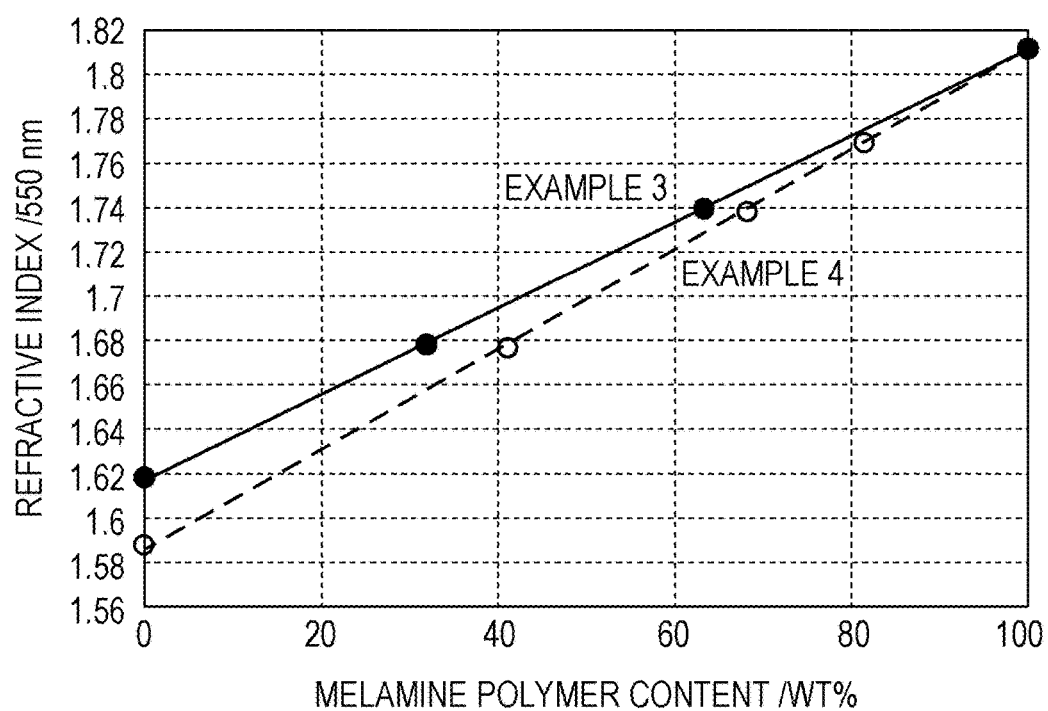
FIG. 9 is a graph showing the relationship between the branched melamine polymer content of a mixed layer of a polyimide b or a polycarbonate and a branched melamine polymer c and the refractive index of the mixed layer in Examples 3 and 4.

The same procedures as in Example 1 were performed except that the linear polymer was a polyimide b having a repeating structure represented by the following general formula (5). The resulting polymer layers had a thickness in the range of approximately 45 to 50 nm and were the following four uniform layers: a polyimide b layer, two mixed layers having a branched melamine polymer c content of 32% by weight or 63% by weight, and a branched melamine polymer c layer. FIG. 9 is a graph showing the relationship between the branched melamine polymer content (% by weight) of a polymer layer and the refractive index of the polymer layer. FIG. 9 shows that the refractive indexes of the mixed layers of the polyimide b and the branched melamine polymer c were plotted on a straight line between the refractive index of the polyimide b layer (1.618) and the refractive index of the branched melamine polymer c layer (1.813).

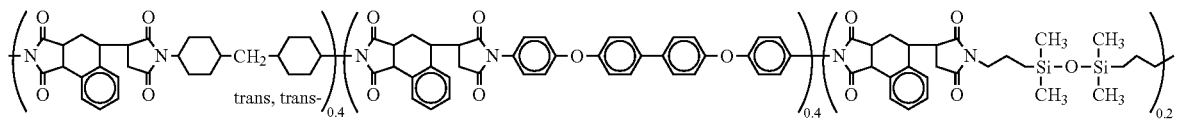

(5)

Example 4

The same procedures as in Example 1 were performed except that the linear polymer was a polycarbonate having a repeating structure represented by the following general formula (6). The resulting polymer layers had a thickness in the range of approximately 45 to 50 nm and were the following five uniform layers: a polycarbonate layer, three mixed layers having a branched melamine polymer c content of 41% by weight, 68% by weight, or 81% by weight, and a branched melamine polymer c layer. FIG. 9 is a graph showing the relationship between the branched melamine polymer content (% by weight) of a polymer layer and the refractive index of the polymer layer. FIG. 9 shows that the refractive indexes of the mixed layers of the polycarbonate and the branched melamine polymer c were plotted on a straight line between the refractive index of the polycarbonate layer (1.588) and the refractive index of the branched melamine polymer c layer (1.813).

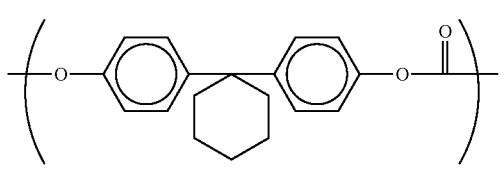

(6)

Example 5

In the same manner as in Example 1, a mixed layer of the polyimide a and the branched melamine polymer c (having a branched melamine polymer c content of 45% by weight and a refractive index of 1.739) was formed on a polished surface of a glass B mainly composed of $La_2O_5$ and having nd–2.00 and vd–28. The polymer layer was spin-coated with a proper amount of precursor sol of aluminum oxide at 4000 rpm for 20 seconds and was baked in a circulating hot-air oven at 140° C. for 60 minutes. The polymer layer was coated with an amorphous aluminum oxide layer.

The polymer layer was then immersed in hot water at 80° C. for 20 minutes and was dried at 60° C. for 15 minutes. The FE-SEM observation of the layer surface showed the presence of a fine textured structure of random complicated crystals mainly composed of aluminum oxide.

Figure 10:
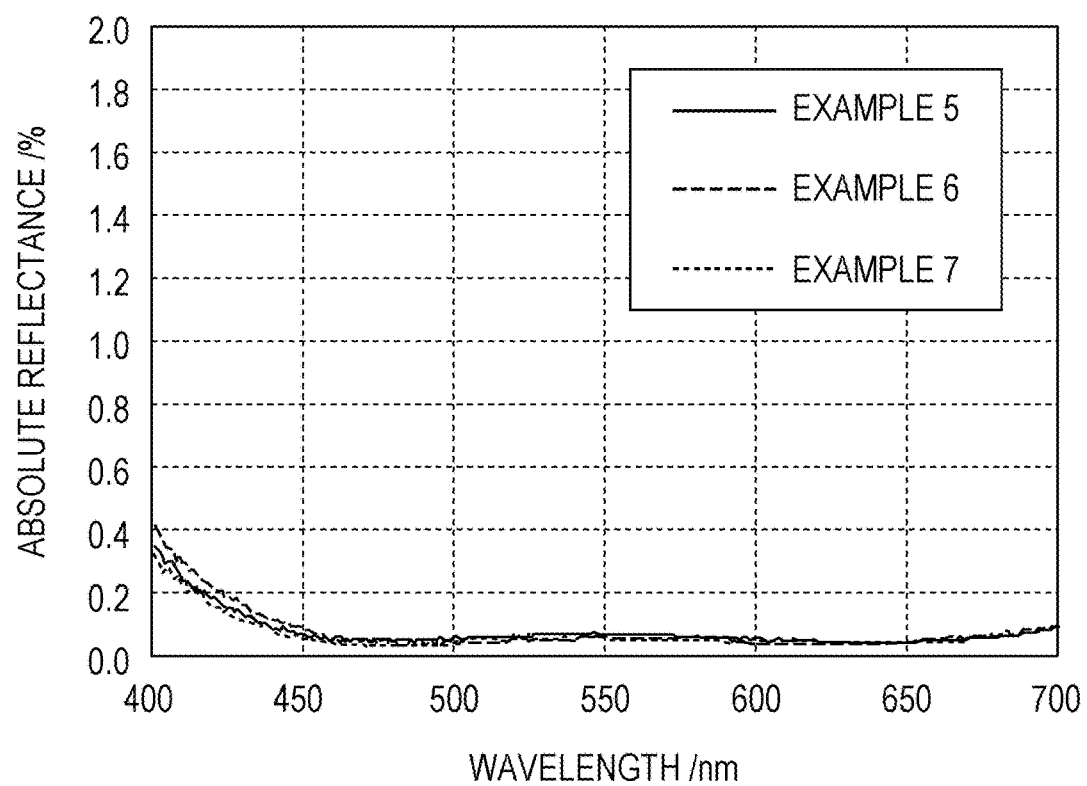
FIG. 10 is a graph of the absolute reflectance of a surface of a glass B on which a polymer layer and a layer having a textured structure of aluminum oxide crystals are stacked in Examples 5 to 7.

The absolute reflectance of the optical film on the glass B was measured. FIG. 10 is a graph of the absolute reflectance of a surface of the glass B on which the polymer layer and the layer having the textured structure of aluminum oxide crystals are stacked in Example 5. The absolute reflectance had a minimum of 0.04% and a mean value of 0.08% at a wavelength in the range of 400 to 700 nm. Thus, the glass substrate had an excellent antireflection surface layer. The glass substrate had no clouding due to light scattering. Table 1 and FIG. 10 show the results.

Example 6

A mixed layer of the polyimide a and the branched melamine polymer d (having a branched melamine polymer d content of 58% by weight and a refractive index of 1.740) was formed as a polymer layer on a polished surface of the glass B in the same manner as in Example 2. An amorphous aluminum oxide layer was formed on the polymer layer in the same manner as in Example 5, was subjected to hot water treatment, and was dried.

A surface of the resulting layer had a fine textured structure of random complicated crystals mainly composed of aluminum oxide.

The absolute reflectance of the optical film on the glass B was measured. FIG. 10 is a graph of the absolute reflectance of a surface of the glass B on which the polymer layer and the layer having the textured structure of aluminum oxide crystals are stacked in Example 6. The absolute reflectance had a minimum of 0.03% and a mean value of 0.07% at a wavelength in the range of 400 to 700 nm. Thus, the glass substrate had an excellent antireflection surface layer. The glass substrate had no clouding due to light scattering.

Example 7

A mixed layer of the polyimide b and the branched melamine polymer c (having a branched melamine polymer c content of 63% by weight and a refractive index of 1.738) was formed as a polymer layer on a polished surface of the glass B in the same manner as in Example 3. An amorphous aluminum oxide layer was formed on the polymer layer in the same manner as in Example 5, was subjected to hot water treatment, and was dried.

A surface of the resulting layer had a fine textured structure of random complicated crystals mainly composed of aluminum oxide.

The absolute reflectance of the optical film on the glass B was measured. FIG. 10 is a graph of the absolute reflectance of a surface of the glass B on which the polymer layer and the layer having the textured structure of aluminum oxide crystals are stacked in Example 7. The absolute reflectance of the glass substrate had a minimum of 0.03% and a mean value of 0.07% at a wavelength in the range of 400 to 700 nm. Thus, the glass substrate had an excellent antireflection surface layer. The glass substrate had no clouding due to light scattering.

Example 8

The photo-curing paint of a branched melamine polymer used in Example 1 was diluted with a mixed solvent of cyclopentanone and cyclohexanone to a concentration of 4.0% by weight to yield a branched melamine polymer c solution. The polyimide a was dissolved in a mixed solvent of cyclopentanone and cyclohexanone to yield a polyimide a solution having a concentration of 3.0% by weight. The branched melamine polymer c solution was mixed with the polyimide a solution at room temperature to yield a blend solution of the polyimide a and the branched melamine polymer c.

A polished surface of the glass B was spin-coated with a proper amount of the polymer blend solution at 3500 rpm for 20 seconds. The polymer blend solution was heated at 140° C. for 30 minutes to form a polymer layer having a thickness of approximately 75 nm. The polymer layer was irradiated with light from an ultra-high-pressure mercury lamp at an illuminance of 13 mW for 70 seconds to cure the polymer layer, thereby forming a mixed layer of the polyimide a and the branched melamine polymer c (having a branched melamine polymer c content of 45% by weight and a refractive index of 1.741).

The polymer layer was spin-coated with a proper amount of sol of silicon oxide fine particles at 3000 rpm for 20 seconds and was baked in a circulating hot-air oven at 200° C. for 60 minutes to coat the polymer layer with a porous layer of silicon oxide having a thickness of 100 nm and a refractive index of 1.28.

Figure 11:
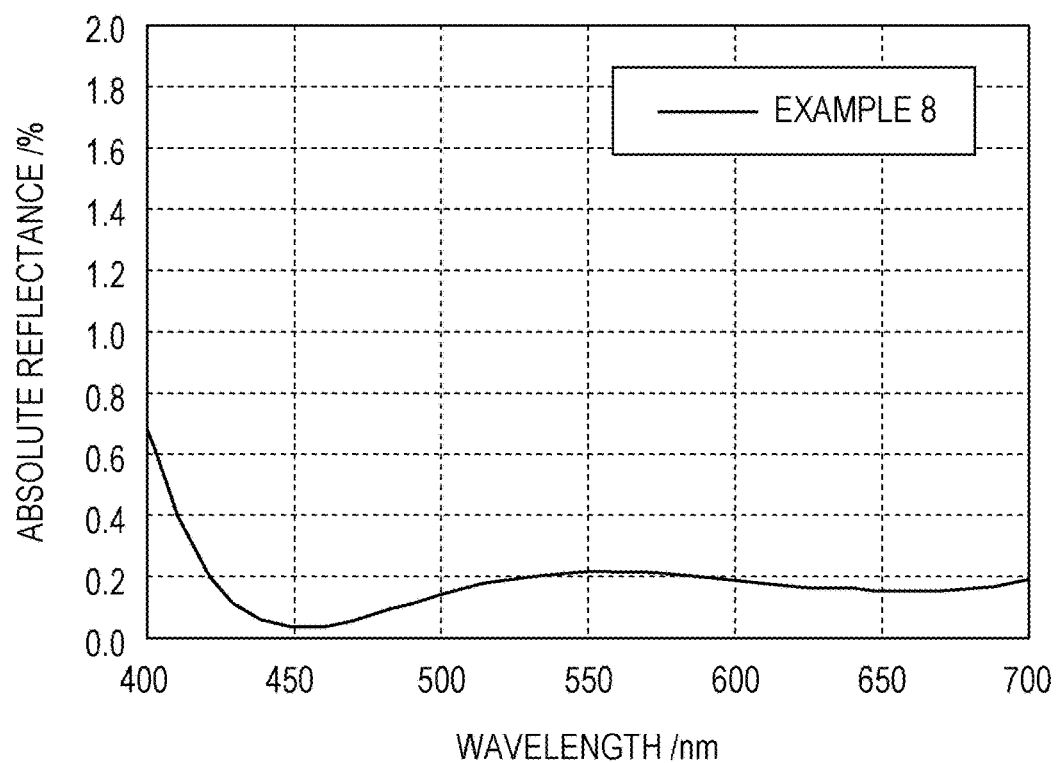
FIG. 11 is a graph of the absolute reflectance of a surface of the glass B on which a polymer layer and a porous layer of silicon oxide are stacked in Example 8.

The absolute reflectance of the optical film on the glass B was measured. FIG. 11 is a graph of the absolute reflectance of a surface of the glass B on which the polymer layer and the porous layer of silicon oxide are stacked in Example 8.

The absolute reflectance of the glass substrate had a minimum of 0.03% and a mean value of 0.17% at a wavelength in the range of 400 to 700 nm. Thus, the glass substrate had an excellent antireflection surface layer. The glass substrate had no clouding due to light scattering.

Comparative Example 1

A polymer layer made of the branched melamine polymer c alone (having a refractive index 1.813) was formed as a polymer layer on a polished surface of the glass B in the same manner as in Example 1. An amorphous aluminum oxide layer was formed on the polymer layer in the same manner as in Example 5, was subjected to hot water treatment, and was dried.

The FE-SEM observation of the layer surface showed the presence of a fine textured structure of random complicated crystals mainly composed of aluminum oxide.

Figure 12:
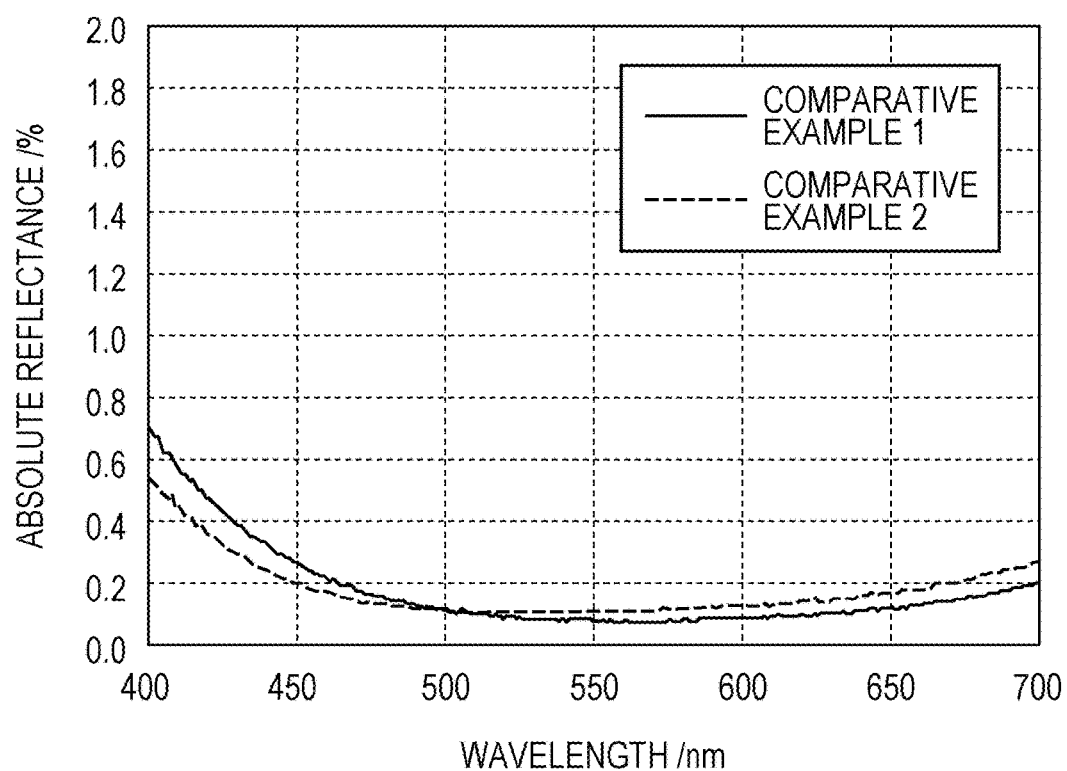
FIG. 12 is a graph of the absolute reflectance of a surface of the glass B on which a polymer layer and a layer having a textured structure of aluminum oxide crystals are stacked in Comparative Examples 1 and 2.

The absolute reflectance of the optical film on the glass B was measured. FIG. 12 is a graph of the absolute reflectance of a surface of the glass B on which the polymer layer and the layer having the textured structure of aluminum oxide crystals are stacked in Comparative Example 1. The absolute reflectance had a minimum of 0.07% and a mean value of 0.17% at a wavelength in the range of 400 to 700 nm. Although the antireflection performance was satisfactory, the minimum reflectance was more than 0.05% because of an uneven polymer layer surface.

Comparative Example 2

A polymer layer made of the branched melamine polymer d alone (having a refractive index 1.782) was formed as a polymer layer on a polished surface of the glass B in the same manner as in Example 2. An amorphous aluminum oxide layer was formed on the polymer layer in the same manner as in Example 5, was subjected to hot water treatment, and was dried.

The FE-SEM observation of the layer surface showed the presence of a fine textured structure of random complicated crystals mainly composed of aluminum oxide.

The absolute reflectance of the optical film on the glass B was measured. FIG. 12 is a graph of the absolute reflectance of a surface of the glass B on which the polymer layer and the layer having the textured structure of aluminum oxide crystals are stacked in Comparative Example 2. The absolute reflectance had a minimum of 0.10% and a mean value of 0.18% at a wavelength in the range of 400 to 700 nm. Although the antireflection performance was satisfactory, the minimum reflectance was more than 0.05% because of an uneven polymer layer surface.

Comparative Example 3

The photo-curing paint of a branched melamine polymer used in Example 1 was diluted with a mixed solvent of cyclopentanone and cyclohexanone to a concentration of 4.0% by weight to yield a branched melamine polymer c solution.

A polished surface of the glass B was spin-coated with a proper amount of the branched melamine polymer c solution at 3500 rpm for 20 seconds. The branched melamine polymer c solution was heated at 140° C. for 30 minutes to form a polymer layer having a thickness of approximately 75 nm. The polymer layer was irradiated with light from an ultra-high-pressure mercury lamp at an illuminance of 13 mW for 70 seconds to cure the polymer layer, thereby forming a polymer layer having a refractive index of 1.816. A porous layer of silicon oxide having a thickness of 101 nm and a refractive index of 1.28 was formed on the polymer layer in the same manner as in Example 8.

Figure 13:
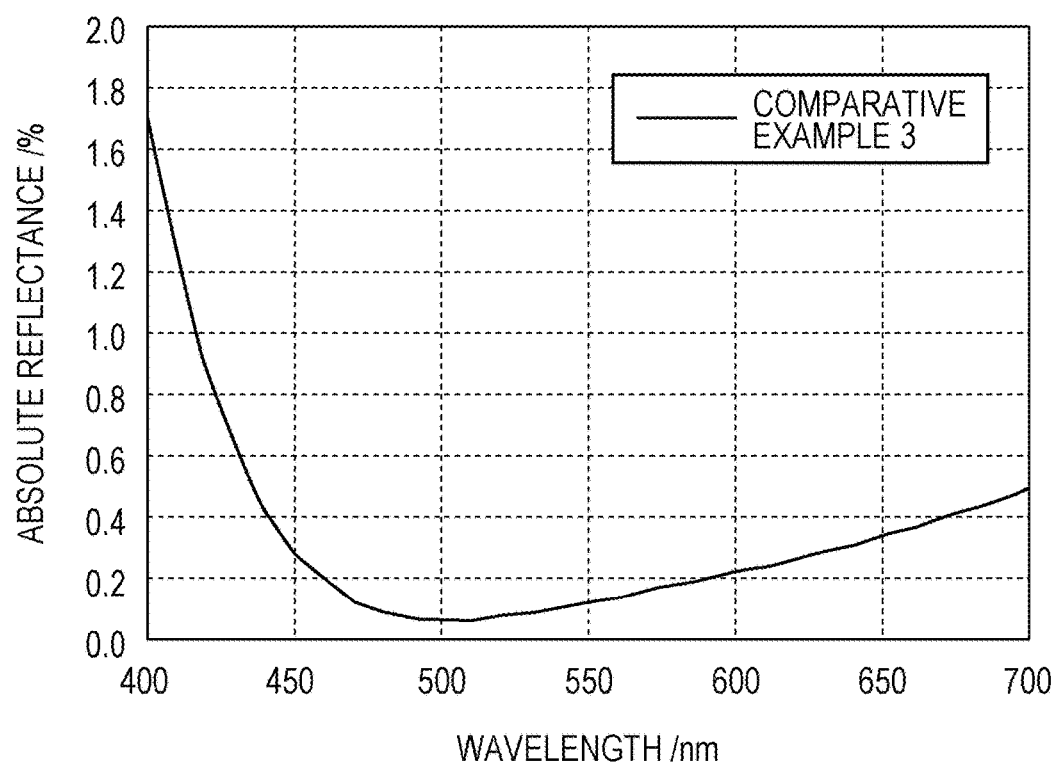
FIG. 13 is a graph of the absolute reflectance of a surface of the glass B on which a polymer layer and a porous layer of silicon oxide are stacked in Comparative Example 3.

The absolute reflectance of the optical film on the glass B was measured. FIG. 13 is a graph of the absolute reflectance of a surface of the glass B on which the polymer layer and the porous layer of silicon oxide are stacked in Comparative Example 3. The absolute reflectance had a minimum of 0.06% and a mean value of 0.35% at a wavelength in the range of 400 to 700 nm. The mean reflectance was more than 0.2%, indicating poor antireflection performance. The minimum reflectance was more than 0.05% because of an uneven polymer layer surface.

Comparative Example 4

A polymer layer made of the polyimide a alone (having a refractive index 1.680) was formed as a polymer layer on the glass B in the same manner as in Example 1. An amorphous aluminum oxide layer was formed on the polymer layer in the same manner as in Example 5, was subjected to hot water treatment, and was dried.

The FE-SEM observation of the layer surface showed the presence of a fine textured structure of random complicated crystals mainly composed of aluminum oxide.

Figure 14:
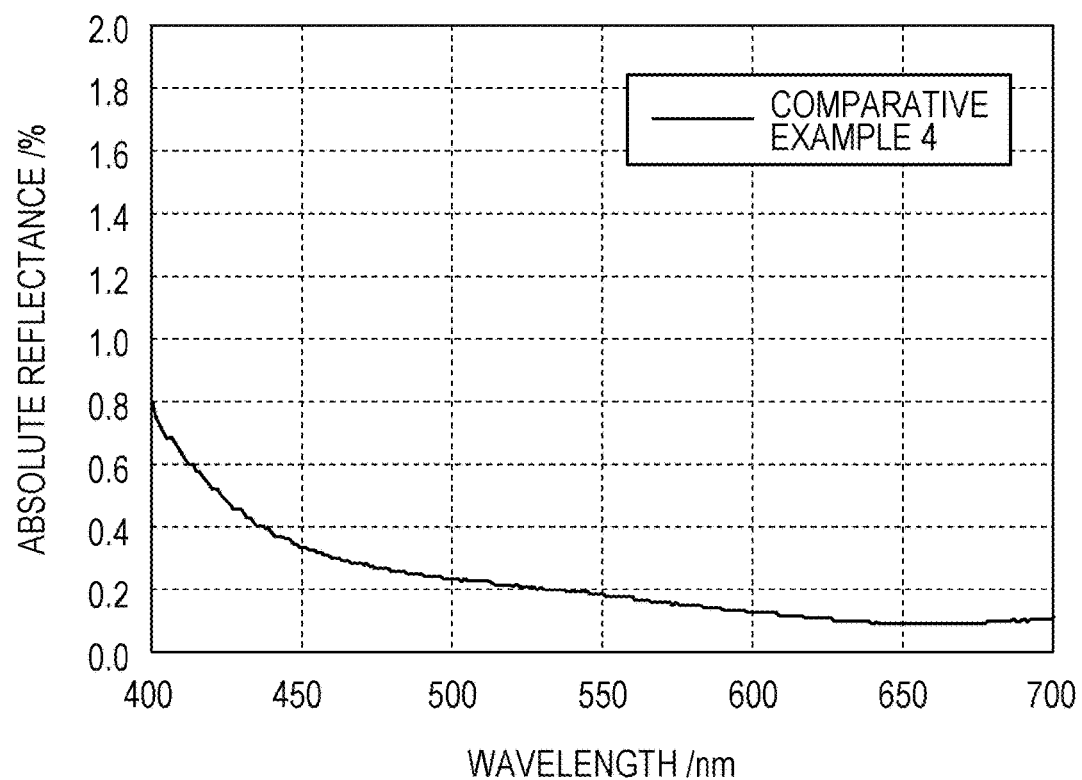
FIG. 14 is a graph of the absolute reflectance of a surface of the glass B on which a polymer layer and a layer having a textured structure of aluminum oxide crystals are stacked in Comparative Example 4.

The absolute reflectance of the optical film on the glass B was measured. FIG. 14 is a graph of the absolute reflectance of a surface of the glass B on which the polymer layer and the layer having the textured structure of aluminum oxide crystals are stacked in Comparative Example 4. The absolute reflectance had a minimum of 0.08% and a mean value of 0.22% at a wavelength in the range of 400 to 700 nm. The refractive index of the polymer layer made of the polyimide a alone was too low to reduce the reflectance of the glass B, resulting in poor antireflection performance. Thus, the minimum reflectance was more than 0.05%, and the mean value reflectance was more than 0.2%.

An optical member according to an embodiment of the present invention can be applied to a transparent substrate having any refractive index and has an excellent antireflection effect for visible light. Optical members according to embodiments of the present invention can be used in various displays for use in word processors, computers, television sets, plasma display panels, and the like; polarizers for liquid crystal displays, and sunglass lenses, prescription glass lenses, viewing lens for cameras, prisms, fly-eye lenses, toric lenses, various optical filters, and sensors made of various optical lens materials and transparent plastics; imaging optical systems, optical systems for observation, such as binoculars, and projection optical systems for use in liquid crystal projectors; various optical lenses, such as scanning optical systems, for use in laser-beam printers; and covers for various measuring instruments and windowpanes for automobiles and trains.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method for manufacturing an optical member including a laminated body configured to reduce light reflection disposed on a substrate, comprising:
    1) preparing a polymer solution by mixing a solution of a linear polyimide polymer dispersed in a solvent and a solution of a branched melamine polymer dispersed in a solvent;
    2) applying the polymer solution to a substrate or a thin film disposed on the substrate and forming a polymer layer of the linear polyimide polymer on the branched melamine polymer on the substrate or the thin film, wherein the polymer layer comprises 37% by weight or more and 55% by weight or less of the branched melamine polymer and 45% by weight or more and 63% by weight or less of the linear polyimide polymer based on a total weight of the linear polyimide polymer and the branched melamine polymer; and
    3) forming a porous layer or a layer having a textured structure on the polymer layer.

2. The method for manufacturing an optical member according to claim 1, wherein the forming of the layer having a textured structure includes
    4) forming a layer mainly composed of aluminum oxide; and
    5) immersing the layer mainly composed of aluminum oxide in hot water to precipitate crystals mainly composed of aluminum oxide.

3. The method for manufacturing an optical member according to claim 1, wherein the branched melamine polymer has a refractive index of 1.7 or more and less than 2.0.

4. The method for manufacturing an optical member according to claim 1, wherein the difference in refractive index between the linear polyimide polymer and the branched melamine polymer is 0.04 or more and 0.4 or less.

5. The method for manufacturing an optical member according to claim 1, wherein the linear polyimide polymer has a lower refractive index than the branched melamine polymer.

6. The method for manufacturing an optical member according to claim 1, wherein the polymer layer has a refractive index of 1.676 to 1.768.

7. A camera comprising an optical member manufactured by the method for manufacturing an optical member according to claim 1.

8. An imaging optical system comprising an optical member manufactured by the method for manufacturing an optical member according to claim 1.

9. A method for manufacturing an optical member including a laminated body configured to reduce light reflection disposed on a substrate, comprising:
    1) preparing a polymer solution by dissolving a powder linear polyimide polymer and a powder branched melamine polymer in a solvent;
    2) applying the polymer solution to a substrate or a thin film disposed on the substrate and forming a polymer layer of the linear polyimide polymer on the branched melamine polymer on the substrate or the thin film, wherein the polymer layer comprises 37% by weight or more and 55% by weight or less of the branched melamine polymer and 45% by weight or more and 63% by weight or less of the linear polyimide polymer based on a total weight of the linear polyimide polymer and the branched melamine polymer; and
    3) forming a porous layer or a layer having a textured structure on the polymer layer.

10. The method for manufacturing an optical member according to claim 9, wherein the forming of the layer having a textured structure includes
    4) forming a layer mainly composed of aluminum oxide; and
    5) immersing the layer mainly composed of aluminum oxide in hot water to precipitate crystals mainly composed of aluminum oxide.

11. The method for manufacturing an optical member according to claim 9, wherein the branched melamine polymer has a refractive index of 1.7 or more and less than 2.0.

12. The method for manufacturing an optical member according to claim 9, wherein the difference in refractive index between the linear polyimide polymer and the branched melamine polymer is 0.04 or more and 0.4 or less.

13. The method for manufacturing an optical member according to claim 9, wherein the linear polyimide polymer has a lower refractive index than the branched melamine polymer.

14. A camera comprising an optical member manufactured by the method for manufacturing an optical member according to claim 9.

15. An imaging optical system comprising an optical member manufactured by the method for manufacturing an optical member according to claim 9.

* * * * *